US012603557B2

(12) United States Patent
Büttner et al.

(10) Patent No.: US 12,603,557 B2
(45) Date of Patent: Apr. 14, 2026

(54) ROTOR WITH DIFFERENT SECTORS

(71) Applicant: Innomotics GmbH, Nuremberg (DE)

(72) Inventors: Klaus Büttner, Hollstadt (DE); Klaus Kirchner, Ostheim (DE); Matthias Warmuth, Windshausen (DE)

(73) Assignee: Innomotics GmbH, Nuremberg (DE)

( * ) Notice: Subject to any disclaimer, the term of this patent is extended or adjusted under 35 U.S.C. 154(b) by 239 days.

(21) Appl. No.: 18/684,495

(22) PCT Filed: Aug. 1, 2022

(86) PCT No.: PCT/EP2022/071564
§ 371 (c)(1),
(2) Date: Feb. 16, 2024

(87) PCT Pub. No.: WO2023/020823
PCT Pub. Date: Feb. 23, 2023

(65) Prior Publication Data
US 2024/0356421 A1       Oct. 24, 2024

(30) Foreign Application Priority Data

Aug. 17, 2021       (EP) ..................................... 21191708

(51) Int. Cl.
| | |
|---|---|
| *H02K 21/14* | (2006.01) |
| *H02K 15/03* | (2025.01) |
| *H02K 15/12* | (2025.01) |

(52) U.S. Cl.
CPC ............. *H02K 21/14* (2013.01); *H02K 15/03* (2013.01); *H02K 15/12* (2013.01); *H02K 2215/00* (2021.08)

(58) Field of Classification Search
CPC .... H02K 1/276; H02K 1/2766; H02K 15/021; H02K 15/03; H02K 15/035

(Continued)

(56) References Cited

U.S. PATENT DOCUMENTS

| | | | | |
|---|---|---|---|---|
| 5,159,220 A | * | 10/1992 | Kliman | ................ H02K 1/2766 310/43 |
| 2009/0079287 A1 | * | 3/2009 | Hattori | ................ H02K 1/2766 310/156.53 |

(Continued)

FOREIGN PATENT DOCUMENTS

| | | | |
|---|---|---|---|
| DE | 10 2009 054 584 A1 | 6/2011 | |
| EP | 2 787 606 A1 | 10/2014 | |
| WO | WO2021019673 A1 * | 2/2021 | ............ F25B 49/025 |

OTHER PUBLICATIONS

U.S. Appl. No. 18/684,495, filed Oct. 15, 2025_WO_2021019673_A1_H.pdf (Year: 2025).*

(Continued)

*Primary Examiner* — Christopher M Koehler
*Assistant Examiner* — Ahmed F Seck
(74) *Attorney, Agent, or Firm* — Henry M. Feiereisen LLC

(57) ABSTRACT

A rotor of a dynamo-electric permanently excited machine has a predefinable number of poles, with the laminated core having laminations, which each form sectors with at least two different configurations in a predefinable axial order and rotation or axial order and rotation and overlap. The laminations, independent of the configuration of the sectors, each have a shaft bore, an identical number of poles or sectors, axially aligned cut-outs and an identical outer diameter. Sectors of a first configuration have elements for distributing a potting compound or an adhesive within the laminated core, and sectors of a second configuration have retaining elements for mechanical strength of the laminated core. The flux barriers and gaps running substantially axially between the permanent magnets and the laminated core surrounding same, are filled with the adhesive and/or a potting compound.

12 Claims, 15 Drawing Sheets

(58) Field of Classification Search
USPC .......................................................... 310/162
See application file for complete search history.

(56) References Cited

U.S. PATENT DOCUMENTS

| 2012/0139378 A1 | 6/2012 | Endo et al. | |
|---|---|---|---|
| 2012/0223607 A1 | 9/2012 | Hakamada et al. | |
| 2013/0241339 A1* | 9/2013 | Buskirk | H02K 1/2766 |
| | | | 310/156.53 |
| 2013/0257190 A1 | 10/2013 | Hamer et al. | |
| 2014/0327329 A1 | 11/2014 | Kitada | |
| 2019/0074738 A1* | 3/2019 | Yabe | H02K 15/03 |
| 2020/0177038 A1 | 6/2020 | Fröhlich et al. | |
| 2022/0263362 A1* | 8/2022 | Tsukamoto | F25B 49/025 |

OTHER PUBLICATIONS

PCT International Search Report and Written Opinion of International Searching Authority mailed Dec. 2, 2022 corresponding to PCT International Application No. PCT/EP2022/071664 filed Aug. 1, 2022.

* cited by examiner

A-A

16

17

18

26   7

ROTOR WITH DIFFERENT SECTORS

CROSS-REFERENCES TO RELATED APPLICATIONS

This application is the U.S. National Stage of International Application No. PCT/EP2022/071564, filed Aug. 1, 2022, which designated the United States and has been published as International Publication No. WO 2023/020823 A1 and which claims the priority of European Patent Application, Serial No. 21191708.3, filed Aug. 17, 2021, pursuant to 35 U.S.C. 119 (a)-(d).

BACKGROUND OF THE INVENTION

The invention relates to a rotor of a permanently excited dynamo-electric machine, a method for producing a rotor of a permanently excited dynamo-electric machine, a permanently excited dynamo-electric machine with such a rotor, and use of a permanently excited dynamo-electric machine.

Industrial low-voltage motors (<1 kV nominal voltage), predominantly in efficiency classes IE4 and higher, usually have rotors with permanent magnets. In this case the permanent magnets are introduced into the pockets, provided for this purpose, of the laminated core of the rotor (these are known as buried permanent magnets).

Once the permanent magnets have been introduced into the pockets, said permanent magnets must be fixed to the laminated core of the rotor. In doing so, any play between laminated core and permanent magnets should be prevented, as this causes a change in the position of the permanent magnets in the event of mechanical effects, such as vibrations and centrifugal forces, during the operation of the permanently excited dynamo-electric machine or because of magnetic forces.

For this, the permanent magnets are usually glued into pockets by means of a reactive plastic adhesive.

A further possibility for fixing the permanent magnets in the pocket is to subsequently pot the pockets fitted with the permanent magnets with a reactive resin, which then has to be cured by thermal action (using a furnace, e.g. 140° C. for 2 hours). On the one hand here the heating and cooling of the entire rotor is a time-consuming and costly process step, while on the other hand such temperatures can result in a partial demagnetization of the permanent magnets.

The design of such laminated cores for rotors is a compromise between different, mutually competing, sometimes even conflicting requirements with regard to electromagnetic and mechanical properties and the suitability for the reliable production of such rotors.

To date the design of such rotor laminations is strictly symmetrical, wherein a compromise consisting of electro-magnetic, mechanical and production-related properties is aimed at. Often a specific property is optimized, which however entails disadvantages for other requirements. For example, an optimization in respect of production-related properties, such as larger gaps for joining and bonding the magnets, results in a reduction in the efficiency of the permanently excited dynamo-electric machine. However, an optimization of the efficiency results in an impaired rotor strength and thus a reduced speed capability of a dynamo-electric machine and problems with the production of the rotor.

One possibility for fixing permanent magnets is to first introduce a paste-like adhesive into the pocket, which is then displaced when the permanent magnet is subsequently inserted, so that it enrobes itself around the permanent magnet. However, said insertion of the permanent magnets into the paste-like material results in a certain positional inaccuracy inside a pocket, since the displaced paste does not enrobe itself evenly around the magnet and thus only selective bonding occurs. The handling of magnetized permanent magnets in this case is not easy and cannot be carried out properly, in the desired manner, due to the magnetic forces, without cleaning the pre-applied adhesive paste off the tool of an auxiliary device after each insertion of a magnet.

DE 10 2009 054 584 Al shows a rotor for an electric machine, comprising plates arranged one above the other to form a plate stack, pockets designed in the plate stack to accommodate permanent magnets and permanent magnets arranged in the pockets, which are attached in a material-bonded manner with a bonding material to the plate stack, wherein the plate stack is provided with at least one cut-out for introduction of the bonding material.

One disadvantage of this is that the riser ducts there designated as cut-outs are arranged in the region of the magnetic flux and thus result in a comparatively low efficiency of a permanently excited dynamo-electric machine with such a rotor.

On this basis, the object of the invention is to create a rotor in order to increase the efficiency and effectiveness of a permanently excited dynamo-electric machine. In this case the production of such a rotor should be comparatively simple, and should require comparatively few process steps during production. The use of the rotor in a permanently excited dynamo-electric machine should additionally provide comparatively advantageous consumption data for a wide variety of drive tasks.

SUMMARY OF THE INVENTION

The object is achieved by a rotor of a dynamo-electric permanently excited machine with a predeterminable number of poles, wherein the poles of the rotor are formed in each case by one or more permanent magnets and form sectors, wherein the permanent magnets are arranged in substantially axially running, circumferentially closed cut-outs of a laminated core, wherein the cut-outs have regions of pockets to accommodate the permanent magnets, and flux barriers to guide a magnetic flux, with retaining elements projecting at least partially into said cut-outs, wherein the laminated core has laminations, which each form sectors with at least two different configurations-built up in a predeterminable axial order and rotation or axial order and rotation and overlap, wherein the laminations, independently of the configuration of the sectors, each have a shaft bore, an identical number of poles or sectors, axially aligned cut-outs and an identical outer diameter, wherein sectors with a first configuration have elements for the distribution of a potting compound or of an adhesive inside the laminated core and sectors with a second configuration have retaining elements for the mechanical strength of the laminated core, wherein the flux barriers, and the substantially axially running gaps between the permanent magnet and the laminated core respectively surrounding it are filled with an adhesive and/or a potting compound.

The object is also achieved by a method for producing an inventive rotor of a dynamo-electric permanently excited machine by the following steps:

stacking of a laminated core made of axially layered laminations with at least two different pole sectors of an axial order and rotation or an axial order and rotation and overlap, wherein the laminations, independently of the configuration of their sectors, each have a shaft bore, an identical number of poles or sectors, axially aligned cut-outs and an identical outer diameter, wherein sectors with a first configuration have elements for the distribution of a potting compound or of an adhesive and/or optimization of the magnetic flux inside the laminated core and sectors with a second configuration have retaining elements for the mechanical strength of the laminated core, insertion of permanent magnets into the cut-outs, attachment of a distribution disk to at least one end face of the laminated core, with at least one feed opening and at least one annular duct on the side facing the laminated core, which covers at least part of the flux barriers of each cut-out, potting of the cavities of the laminated core with an adhesive and/or a potting compound via the feed opening and the annular duct of the distribution disk, the flux barriers, and the substantially axially running gaps between the permanent magnet and the respective laminated core surrounding it, so that at least the permanent magnets of the rotor are fixed.

The object is also achieved by a dynamo-electric machine, in particular a permanently excited synchronous machine with an inventive rotor.

The object is also achieved by the use of a dynamo-electric machine, in particular a permanently excited synchronous machine, in compressors, compactors, pumps and drives of conveyor belts, in the food industry and in maritime applications.

In accordance with the invention, a rotor is now provided which forms a compromise between different, mutually competing requirements in respect of the electromagnetic and mechanical properties and the suitability for reliable production of such rotors. This results in an increase in the efficiency and effectiveness of a permanently excited dynamo-electric machine.

In accordance with the invention, the unbundling of mutually competing requirements in respect of the electromagnetic and mechanical properties and the suitability for reliable production of such rotors with virtually identical laminations results in differently configured pole sectors of a rotor. This not only ensures the comparatively simple manufacture of the rotor, but also the efficient operation of a dynamo-electric permanently excited machine.

A laminated core is understood in this case as the active part of the rotor which has axially stacked laminations and is provided with permanent magnets and contributes to the formation of torque, but not any distribution disks and/or cover disks on the end-face end of the laminated core of the rotor.

Cut-outs are understood in this case as blankings of the individual laminations which are stacked and arranged axially one after the other. The cut-outs have pockets as well as the flux barriers. The pockets are provided to accommodate the permanent magnet or permanent magnets. Optional retaining elements, such as webs, edge webs, retaining webs and/or retaining lugs project into the space of the cut-outs for the additional fixing and retention of the permanent magnets during manufacture and/or in operation of the dynamo-electric machine against centrifugal force loads. The permanent magnets are inserted axially into the pockets of the cut-outs.

By optimizing the respective design of a sector to as few requirements as possible the electromagnetic and mechanical properties of the rotor fitted with permanent magnets is improved. In other words, sectors are substantially optimized either in accordance with electromagnetic requirements or in accordance with mechanical requirements. In this case there are sectors—with a first configuration—of the lamination that are designed to feed and distribute a potting compound or an adhesive into the cut-outs—thus are implicitly designed in accordance with electromagnetic considerations. In addition there are sectors—with a second configuration—of the lamination that are substantially designed for mechanical stabilization inter alia of the entire laminated core. These respective tasks of these sectors with their first and second configurations can each be further subdivided, so that there can be third, fourth or even further configurations of the sectors.

Thus third configurations of the sectors can have partial blankings. Fourth configurations of the sectors can have reinforced retaining webs.

This results in the following possible non-exhaustive list of options for designing laminated cores:

Each plate of a laminated core is identical.

Each pole is arranged in a sector.

Sectors either have a first configuration, which is responsible for the distribution of a potting compound or adhesive (such as partial blankings, narrow or small retaining webs, etc.) or a second configuration, which is responsible for the mechanical stability (such as edge webs, retaining webs; retaining lugs, etc.). Furthermore, sectors can be present with a third configuration which has partial blankings. Furthermore, sectors can be present with, a fourth configuration, which merely have a basic layout.

In another embodiment, each plate has only a first or second configuration of its sectors, wherein the remaining sectors only have the basic layout.

In another embodiment, each lamination is again identical and each pole is arranged in a sector. One or more sectors have a first configuration for the distribution of a potting compound or of an adhesive (partial blankings, narrow retaining webs or none at all, etc.). One or more sectors have a second configuration for mechanical stabilization, such as edge webs, retaining webs, retaining lugs, etc.

Each pole or sector of the rotor has at least one cut-out. Where there are multiple cut-outs per pole they are arranged in a V-shape, in a U-shape or in the shape of a roof. Each pocket of a cut-out has one or more permanent magnets. Each pole of a laminated core is arranged in a sector and is provided, independently of the respective sector, with the identical "set" of permanent magnets.

In addition to the shared basic layouts, such as shaft bore, axially aligned cut-outs, the same number of poles and the same outer diameter for the optimization of the individual requirements, the individual laminations are now assigned additional specific properties (such as first configuration, second configuration, etc.) of at least some of their poles or sectors.

The first and second, etc. configurations are in this case to be understood as different layout variants of the respective sectors or poles of a lamination.

Feeding an adhesive or a potting compound via the flux barriers enables the permanent magnets to be securely fixed (e.g. glued/potted) in the respective pockets. The adhesive or potting compound is administered with or without pressure.

Sectors with the second configuration now have properties, in particular retaining elements, which contribute to the mechanical stabilization of the lamination and of the laminated core. These retaining elements are designed in the form of retaining webs and/or retaining lugs and/or edge webs, in order to ensure the mechanical stability of the lamination and of the laminated core and to fix the permanent magnets, at least during manufacture, in other words the potting process.

Furthermore, sectors can have a first and/or third configuration in the region of the cut-outs, in particular the pockets, in the form of partial blankings, which represent an extension of the pocket, and which facilitate a gluing procedure and/or potting. These partial blankings on the pockets, which by their shape and position form defined capillaries, help to securely fix the permanent magnets by gluing/potting them in the pockets. This results in a greater selection in respect of the viscosity of the adhesives/potting compounds that can be employed.

To configure the distribution procedure inside an axially running cut-out particularly efficiently, these partial blankings are additionally also possible for sectors with a second configuration.

The basic layout now has the following properties: shaft bore, cut-outs, the same number of poles and the same outer diameter.

The properties in addition to these, retaining elements for mechanical reinforcement and partial blankings, are implemented in the case of the respective laminations only for one pole or sector, but in the case of multiple poles or sectors not for all poles or sectors at the same time. In other words, the sectors differ from one another, viewed in the circumferential direction, in at least one feature.

If the properties in addition to these, such as retaining elements for mechanical reinforcement and partial blankings, are present in only one or some—but not all—poles of one of the laminations, these properties can be assigned to all poles in the axial progression of the laminated core. In this case these properties are specifically assigned to the predetermined poles or sectors during stacking using twist stacking and/or overlap stacking.

Twisted or twisted and overlapped or just overlapped is in this case formed by an angle that results from the number of poles p of the rotor.

The number of sectors with a first and/or second, etc. configuration also influences the cumulation of rotation and/or overlap of the laminations in the axial structure of the laminated core. In other words, with an 8-pole rotor with a configuration of only one sector with a first configuration a rotation is to be provided more often than with a configuration of two or more sectors with a first configuration.

Another advantage is that by the twisting or twisting and overlap of the laminations, anisotropies from the material properties of the lamination (strength and magnetic properties are for example dependent on the direction of rolling) are equalized. Viewed over the axial length of the laminated core of the rotor, this leads to a homogenization of magnetic properties of the entire laminated core, which helps to increase the efficiency and smooth running of the rotor.

Further optimizations of the respective sector of a lamination are, in respect of mechanical strength, the configuration of the retaining elements, the borders of the flux barriers and of the webs, in order to hold the permanent magnets in the pockets of the cut-outs. In this case the number and shape of the retaining elements, webs, retaining lugs and edge webs can be adjusted as required.

The cut-outs present in the rotor then have, viewed in the axial progression, all possibilities for individual optimization. Depending on speed requirements and associated centrifugal force loads, the potting material provided, etc., the configurations assigned to the sectors (first, second or even third configuration) and the axial sequence thereof as well as if appropriate the twisting and/or overlap thereof must accordingly be performed.

In addition, the laminations can, in order further to improve the mechanical stability of the laminated core, at least in part be axially glued to one another in a predeterminable axial order, if appropriate with twisting and/or overlap.

Thus webs, such as retaining webs, edge webs, especially in the second pole sectors, which serve to stabilize the laminated core, can be omitted or at least designed with smaller dimensions, which reduces the magnetic leakage flux.

In the axial progression of the laminated core, the selective optimization of individual cut-outs in the respective sectors, in particular pockets, in respect of one requirement, significantly reduces the negative effects on other requirements.

Stacking of the plates, in other words the axial sequence of the plates and/or the twist and/or overlap thereof, can take place on an auxiliary shaft. Likewise it is possible to glue the laminations axially to one another.

Punch stacking of the laminations is likewise possible, in order to obtain a laminated core into which the permanent magnets can be inserted.

Additional stacking takes place if the laminated core is located on the actual shaft. In this case the laminated core is pressed together by means of two disks. These can be two distribution disks or one distribution disk and a cover disk.

Stacking of the laminated core can also take place using tie rod connections.

In order now to be able to introduce an adhesive or a potting compound into the laminated core of the rotor via the flux barriers, a distribution disk is provided on at least one end face of the laminated core. This is attached once the permanent magnets are in their pockets, in order to introduce the adhesive or the potting compound.

At least one of the two disks is a distribution disk in this case.

The laminated core and/or the distribution disks are preferably shrunk onto the shaft. Other possibilities likewise exist for transferring the torque from the laminated core to the shaft, such as feather key connections, etc.

On the side facing the laminated core of the rotor the distribution disk has at least one circumferential annular duct open toward the laminated core in order to deliver the adhesive or the potting compound via the flux barriers of the respective cut-outs. Depending on the structure of the magnetic pole, the annular ducts must be positioned accordingly on the distribution disk.

On the side of the distribution disk facing away from the laminated core, at least one injection opening, i.e. a feeder, is provided in order to feed the annular duct and thus the laminated core. In the region of a flux barrier of the cut-outs of a pole of the rotor the annular duct optionally has extensions in order to be able to provide sufficient potting compound for the respective pole or the cut-outs thereof provided with permanent magnets.

The annular duct and optionally the extension thereof form a form-fit and tight seal with the end face of the laminated core, in order to be able to build up a corresponding pressure and thus if appropriate the necessary shear forces for the respective potting material.

In one possible method for potting the laminated core of the rotor the potting compound has a thixotropic behavior, wherein the viscosity decreases in consequence of an external influence (e.g. pressure) and returns to the initial viscosity after the stress has ended.

Other potting compounds or adhesives are however also possible.

With constant shear (pressure) the viscosity of the potting compound decreases over time, and on termination of the shear load the viscosity of this potting compound increases again as a function of time.

The potting compound is made thixotropic by, among other things, adding and dispersing Aerosil pyrogenic silicic acid in the range between 0.1 and 0.5% by volume.

Before the potting compound is fed to the rotor via the distribution disk by way of a line or a hose, the constituents thereof comprising at least two separate components are repositioned by relative movement so that there is a uniform and clearly defined distribution of the components to be mixed.

The base resin material of the potting compound here corresponds to a two-component reactive resin based on epoxy/amine or e.g. polyurethane/isocyanate. Gelation at room temperature can be achieved here after a few minutes to a few hours, so that the compound largely solidifies without additional heating (and the associated further liquefaction of the resin mixture).

Thus with low shear forces (approx. 10 Pa) a shear viscosity of approx. $10^5$-$10^7$ mPas occurs. With increased shear forces (approx. 200 Pa) a shear viscosity of approx. $10^2$-$10^4$ mPas occurs. These shear forces are introduced into the potting compound by pressure.

A recovery of the material, or rather of the viscosity, takes place within a few minutes after the shear forces decrease (after the pressure decreases), resulting in self-solidification of the potting compound, so that there are no longer any flow paths through thin gaps, in particular between the individual laminations of the laminated core, in the rotor.

The volume shrinkage of a rotor filled in this way is less than 1%.

The potting compound, which preferably cures at room temperature, can firstly, in addition to its rheological behavior being made highly thixotropic, be made thermally conductive (>0.5 W/mK) using suitable additives. These additives are admixed before being fed into the rotor, in particular to the distribution disk of the potting compound. During operation of the dynamo-electric machine this results in improved heat dissipation from the permanent magnets, since these are heated by eddy currents and/or air gap harmonics. Thus the permanent magnets with a comparatively improved thermal conductivity are coupled to the laminated core of the rotor.

The thermal conductivity of the potting compound or adhesive can be achieved by adding or mixing in various fillers. The additives provided in this case are quartz flour, fused silica, aluminum oxide, chalk. The individual components can be admixed together or else individually into the fillers (potting compound, adhesive) and can thus comprise up to 40% by volume of the entire potting compound or adhesive.

The rotor is advantageously charged with potting compound as the potting wells up with increased potting pressure. In this case the axis of the rotor is aligned about a predefined angle compared to the horizontal, preferably 90°.

It behaves likewise with other adhesive materials.

Due to the upwelling potting compound, bubble-free application is ensured, especially in the cut-outs.

A static/dynamic mixing tube is used for mixing, in order to mix the reactive mixture in situ and then to apply it directly into the rotor, in particular the laminated core, via the distribution disk on an end face of the rotor via the bore holes.

Distribution disks can also be provided on both end faces of the rotor, in order to charge the rotor from both sides. In this case the distribution disks are either identical or are designed such that each distribution disk provides just half of the poles of the rotor with potting compound. Charging with potting compound on both sides can be advantageous, especially in the case of axially long rotors.

Pressures of up to 10 bar, preferably 4.5 bar, can be applied via one or more suitable injection terminals on the distributor disk, as a result of which the freshly mixed potting compound that has been made thixotropic becomes flowable and reaches the remaining geometric intermediate spaces of the rotor axially, in particular wells up axially.

Intermediate spaces in this case mean the flux barriers, the gaps between the permanent magnets and the respective laminations, the feed ducts and the bore holes, but not or virtually not the slits between the individual laminations perpendicular to the axis.

Once the cut-outs have been fully charged the pressure is released.

The fact that the laminated core with the crucial intermediate spaces is "full" is detected via the static pressure in comparison with the dynamic pressure (detection e.g. via pressure build-up of dynamic vs. static pressure).

A visual check is likewise possible.

The potting compound in the rotor then gels without pressure at room temperature and cures fully within 24 hours.

Thus in accordance with the invention the rotor with its permanent magnets is potted with a potting compound that imparts thixotropy and that gels at room temperature and cures fully.

Due to the high filling and use of additives that impart thixotropy, the pockets can be filled in an upwelling manner by means of a pressure process, without however the reactive compound being able to leak through small slits, e.g. between the individual laminations.

It is possible to continue working on and with the rotor without mechanical stress after approx. 1 hour. The material, in other words the potting compound, is prevented from penetrating through the individual laminations due to the thixotropy imparted to the potting compound, so that there is no need to paint the external lateral surface first.

A suitable distribution disk, which in the potting process is provided on at least one end face of the laminated core of the rotor, connects an annular duct, via one or more feeders on the distribution disk, to all provided extensions via the bore holes, in order to "fill" the rotor by a single injection with a filling process.

The distribution disk thus satisfies multiple functions. Firstly stacking of the laminated core on the shaft, distribution of the potting compound or adhesive and additionally as optional possibilities balancing of the rotor. In this case the balancing of the rotor is performed by removing material from the distribution disk or by additionally attaching balancing weights to the distribution disk.

This distribution disk is therefore attached to the face of the laminated core in a form-fit manner in advance and can also be used to balance the rotor after the potting process. In order to perform the balancing sustainably, the distribution disk must remain on the laminated core of the rotor.

A permanently excited synchronous machine fitted with such a rotor has a high efficiency class and is thus suitable for a drive, especially for the continuous operation of compressors, compactors, conveyor belts, etc.

BRIEF DESCRIPTION OF THE DRAWING

The invention and further configurations of the invention are explained in greater detail on the basis of schematically illustrated exemplary embodiments, in which.

DETAILED DESCRIPTION OF PREFERRED EMBODIMENTS

Figure 1:
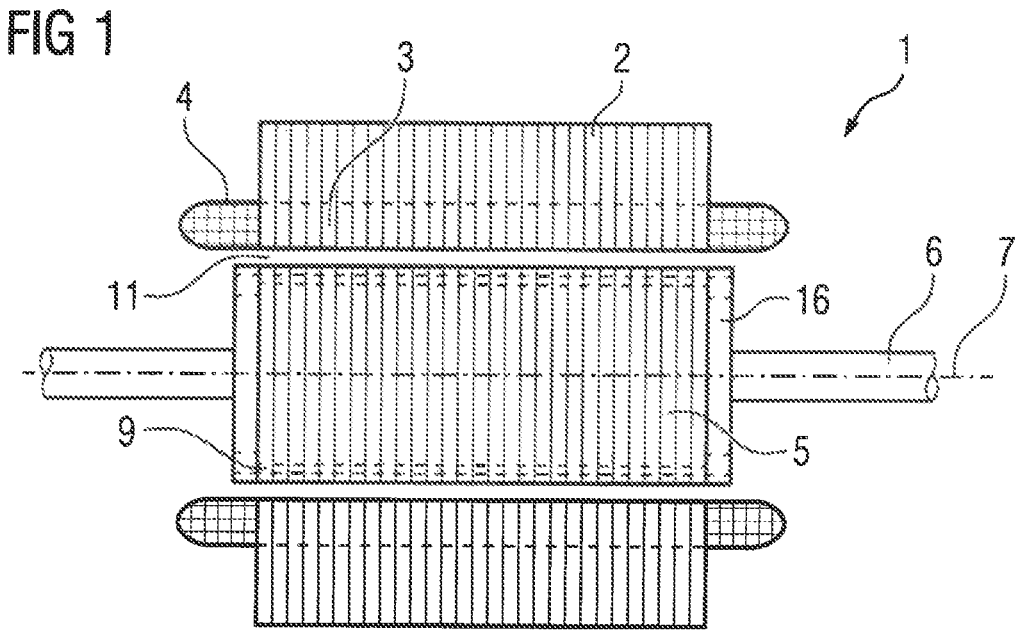
FIG. 1 shows a schematic longitudinal section of a dynamo-electric machine.

It may be noted that terms such as "axial", "radial", "tangential", etc. relate to the axis 7 used in the respective figure or in the respectively described example. In other words the directions axial, radial, tangential always relate to an axis 7 of the rotor 5 and thus to the corresponding axis of symmetry of the stator 2. In this case "axial" describes a direction parallel to the axis 7, "radial" describes a direction orthogonal to the axis 7, toward it or also away from it, and "tangential" is a direction which is directed in a circle around the axis 7 at a constant radial distance from the axis 7 and at a constant axial position. The expression "in the circumferential direction" is equivalent to "tangential".

In respect of a surface, for example a cross-sectional surface, the terms "axial", "radial", "tangential", etc. relate to the orientation of the normal vector of the surface, i.e. the vector which stands perpendicularly on the surface in question.

The expression "coaxial components", for example coaxial components such as rotor 5 and stator 2, should here be understood to mean components that have the same normal vectors, for which in other words the planes defined by the coaxial components are parallel to one another. Furthermore, the expression should imply that the center points of coaxial components lie on the same axis of rotation or axis of symmetry. However, these center points can if appropriate lie on this axis at different axial positions and the aforementioned planes can therefore be at a distance >0 from one another. The expression does not necessarily require that coaxial components have the same radius.

The term "complementary" means in connection with two components that are "complementary" to one another that their external shapes are configured such that a component can preferably be arranged fully in the component complementary to it, so that the inner surface of one component and the outer surface of the other component ideally touch without gaps or fully. Consequently, in the case of two mutually complementary objects, the external shape of one object is determined by the external shape of the other object. The term "complementary" could be replaced by the term "inverse".

For the sake of clarity, frequently in cases when multiple components are present not all components illustrated in the figures are provided with reference characters.

FIG. 1 shows a schematic longitudinal illustration of a dynamo-electric machine 1, in this case a permanently excited synchronous machine. This permanently excited synchronous machine has a stator 2 which has, in the slots not shown in greater detail, a winding system 3, e.g. tooth-wound coils or short-pitch windings, which forms a winding overhang 4 at the end faces of the stator 2. Due to electromagnetic interaction via an air gap 11 a rotor 5 is set in rotation about an axis 7 by an energized winding system 3. The rotor 5, which is arranged coaxially to the stator 2, has permanent magnets 9 arranged in axially running cut-outs 21 of a laminated core 30, which are also referred to as buried permanent magnets 9. The laminations 8 of the rotor 5 are stacked and are connected to a shaft 6 in a rotationally fixed manner, at least in part.

The rotor 5 is connected to the shaft 6 in a rotationally fixed manner via selected laminations 8 of the laminated core 30 or the entire laminated core 30 and/or additionally by distribution disks 16 or cover disks.

The explanations in respect of the lamination 8 in accordance with FIG. 2 should also be applied analogously to the laminations in the following figures.

Figure 2:
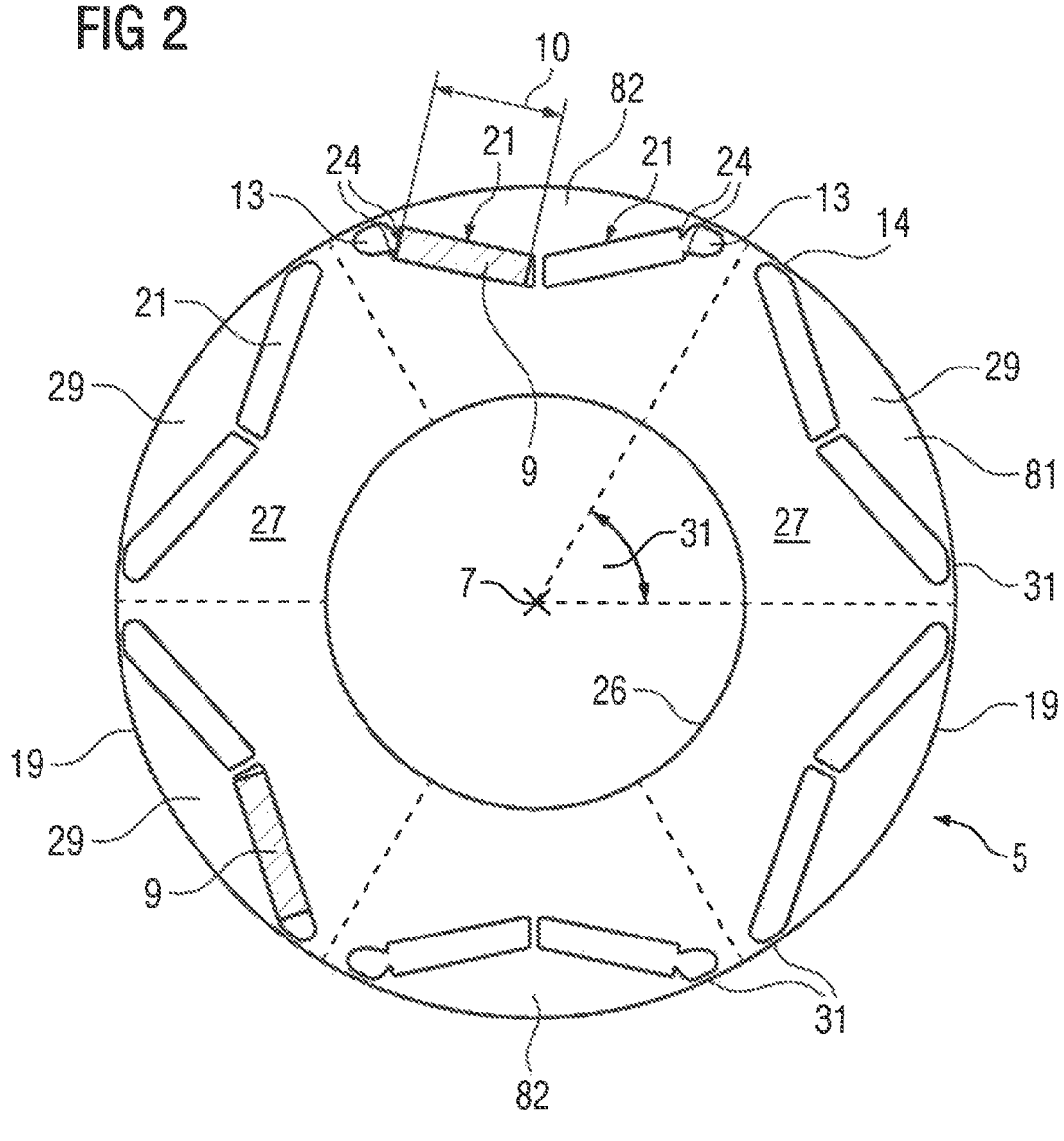
FIGS. 2 to 6 show laminations with different sectors.

Thus FIG. 2 shows a lamination 8 of a laminated core 30, which with the permanent magnets 9 forms magnetic poles 27 of the rotor 5. Each magnetic pole 27 occupies a sector 29 of the lamination 8 of the rotor 5. The sector 29 is related to the angle 31 of its magnetic pole 27 viewed in the circumferential direction, i.e. the smaller the angle 31, the more multi-pole the rotor 5. In other words, with a four-pole rotor 5 the sector 29 is 90°, with a six-pole rotor 60°, with an eight-pole rotor 45°, etc.

In this six-pole embodiment the pole 27 is formed by two permanent magnets 9 arranged in a V-shape. Viewed in cross-section, the poles 27 of the rotor 5 can likewise be formed from multiple permanent magnets 9, for example from double-V-shaped arrangements, from U-shaped arrangements or W-shaped arrangements or else only from tangentially arranged permanent magnets 9. These non-exhaustive configurations and arrangements of permanent magnets 9 in poles 27 can be seen by way of example in FIGS. 16 to 26.

Multiple permanent magnets 9 per cut-out 21 are also provided in the axial direction, depending on the axial length of the rotor 5.

Cut-outs 21 in a lamination 8, wherein axially arranged laminations 8 form a laminated core 30, are in this case blankings of the individual laminations 8, which are arranged stacked, axially one behind the other. The cut-outs 21 are thus aligned axially. The cut-outs 21 have pockets 10 as well as the flux barriers 13. The pockets 10 are provided to accommodate the permanent magnet or permanent magnets 9. Webs and/or retaining lugs 24 optionally project into the space of the cut-outs 21 to additionally fix and hold the permanent magnets 9 during manufacture and in operation of the dynamo-electric machine 1 in order to counter centrifugal force loads.

The permanent magnets 9 are thus arranged in the cut-outs 21, wherein a cut-out 21 is made up of flux barriers 13, of if appropriate optional retaining elements 24 and of pockets 10. The pockets 10 are in this case provided to accommodate the permanent magnets 9, the flux barriers 13, and if appropriate retaining elements 24 serve to optimize the magnetic flux or to fix the permanent magnets 9 in the laminated core 30 of the rotor 5.

Advantageously in this case—as is explained later—potting compound is also introduced into the cut-outs 21 via the flux barriers 13.

Ideally, the permanent magnets 9 are placed in the cut-outs 21 without gaps to the laminations 8—and thus form a gap-free and full-surface system. However, such an almost complementary arrangement is not possible for manufacturing-related reasons. For manufacturing reasons, axially running gaps arise between the permanent magnets 9 and the laminations 8, and these must be closed.

These laminations 8 now have, viewed in the circumferential direction, multiple sectors 29, wherein these sectors 29 can have first configurations 81 or second configurations 82. Besides the basic layout of the laminations 8, such as shaft bore 26, cut-outs 21, the same number of poles 27 and the same outer diameter, the sectors 29 with a first configuration 81 have means and/or elements in order to facilitate a distribution of a potting compound in the laminated core 30 and to obtain an optimal progression of magnetic flux. The sectors 29 with a second configuration 82 have means and/or elements which sufficiently mechanically safeguard the laminated core 30 even at high speeds of the rotor 5. This is done for example by mechanical retaining elements, for example reinforced edge webs 31, retaining lugs 24 and retaining webs 28 for the mechanical reinforcement of the respective sector 29 and thus also of the laminated core 30.

Figure 7:
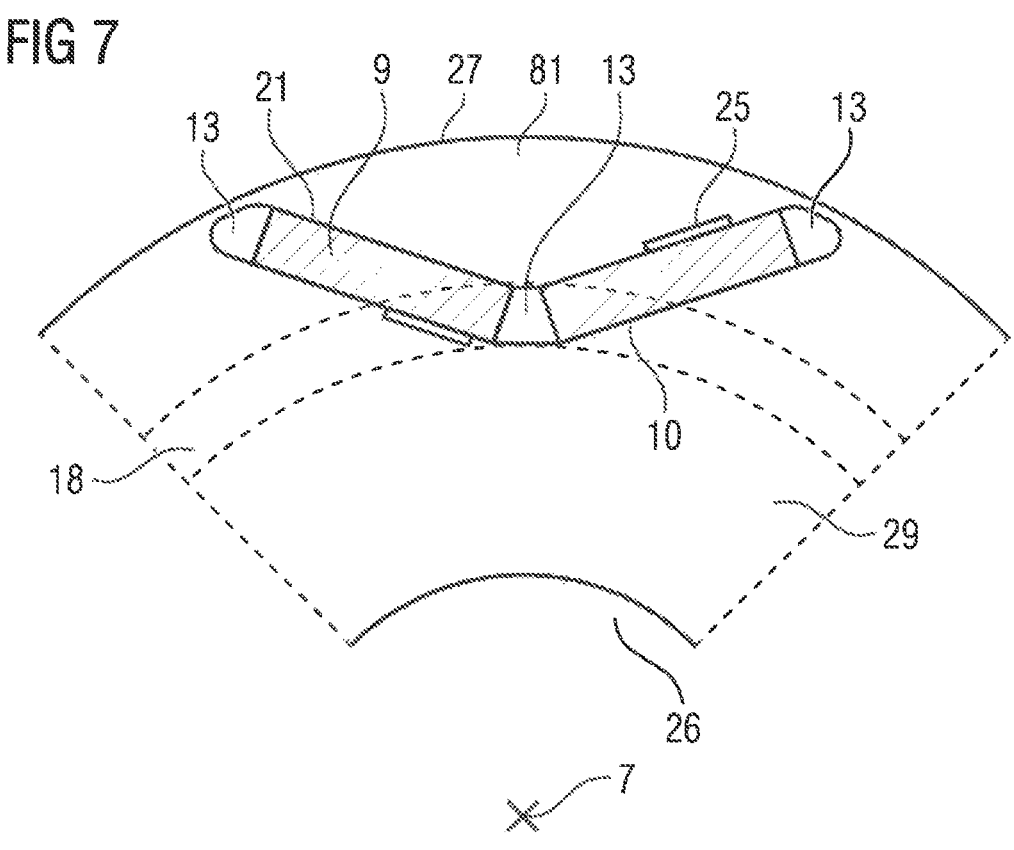
FIGS. 7, 8 show detailed views of a sector.

Partial blankings 25, such as also in particular illustrated in FIG. 7, are preferably present in sectors 29 with a first configuration 81.

Due to shape and position these partial blankings 25 form defined capillaries, which help to securely fix the permanent magnets 9 by gluing/potting in the pockets 10. In the production process of the rotor 5 this allows a greater selection in respect of the viscosity of the adhesives/potting compounds that can be used.

However, it is also possible for the partial blankings 25, independently of the sectors 29, to extend over the entire axial length of one or more pockets 10 of the laminated core 30, if appropriate even to take a meandering course, in order to obtain a sufficient distribution of a potting compound 20 or of an adhesive in the laminated core 30.

Likewise it is possible to design the pockets 10 with such partial blankings 25 only axially in part. To this end, the corresponding sectors 29 must then be configured.

Since specific properties of the sectors 29, such as first configuration 81, second configuration 82, etc., in other words such as retaining elements 24 for the mechanical reinforcement and partial blankings 25, are present in only one or some—but not all—sectors 14 of the lamination 8, these properties can be assigned to all poles 27 or sectors 29 in the axial progression of the laminated core 30. In this case these properties are specifically assigned to the intended magnetic poles 27 or to the respective sectors 29 during the stacking of the laminated core 30 by twist stacking and/or overlap stacking of the individual laminations 8.

Twisting or twisting and overlapping occurs in this case due to an angle that results from the number of poles p of the rotor 5.

In other words, overlapping is always by 180°, so that a front side of a lamination 8 becomes a rear side of the lamination 8. Twisting is always by an angle 31 of the sector 14, in other words, e.g. with a six-pole rotor 5 by 60° or an integer multiple (2-, 3- or 4-fold) thereof.

Another advantage is that by twisting the laminations 8 anisotropies from the material properties of the lamination (strength and magnetic properties are for example dependent on the direction of rolling during the production of the laminations) are equalized. Viewed over the axial length of the laminated core 30 of the rotor 5, this results in a homogenization of the magnetic properties of the entire laminated core 30, which helps to increase the efficiency and the smooth running of the dynamo-electric machine 1.

Further optimizations of the respective laminations are, in respect of mechanical strength, the configuration of the retaining elements 24, the borders or edge webs 31 of the flux barriers 13 in the region of the surface 19 of the rotor 5 and of the retaining lugs 24, in order to hold the permanent magnets 9 in the pockets 10 of the cut-outs 21. In this case the number, axial and/or radial thickness and shape of the retaining elements, retaining lugs 24 and edge webs 31 can be predefined as required during the punching process.

When dimensioning the flux barriers 13 of the cut-outs 21, consideration should be given not only to the magnetic requirements, but also to the requirements for the distribution of the adhesives and potting materials that can be employed.

The administration of the adhesive or of the potting compound 20, via and into the flux barriers 13, takes place during the filling process with or without pressure.

The cut-outs 21 present in the rotor 5 then have, viewed in the axial progression, all possibilities for the individual optimization of their respective sectors 29, in order to obtain a laminated core 30 specifically tailored to the rotor 5 and its area of application, e.g. speed range. Depending on speed requirements and associated centrifugal force loads, the intended potting material, etc., the sectors 29 of the laminations 8 are accordingly designed with a first configuration 81, second configuration 82, if appropriate third configuration 83 and the axial sequence and twist and/or overlap thereof, in order to obtain a laminated core 30.

Figure 4:
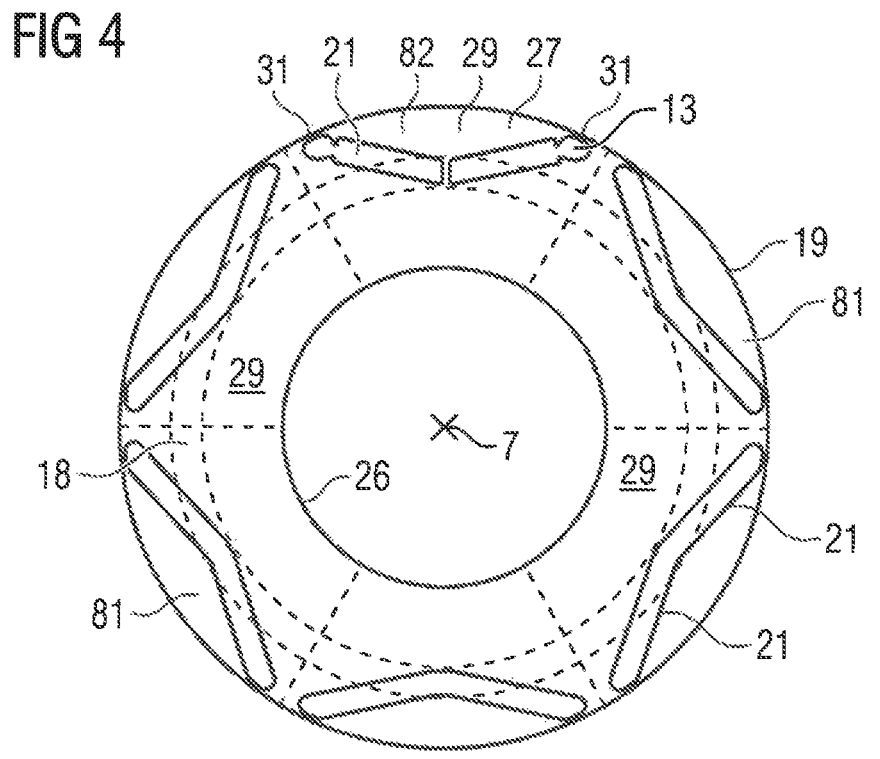

Additionally or instead, the laminations 8 can, in order to obtain a mechanical stability of the laminated core 30, be at least partially glued together in a predeterminable axial order, with twist and/or overlap. Thus if appropriate retaining webs 28 or edge webs 29, which serve to stabilize the laminated core 30, can be designed with smaller dimensions or as regards the retaining webs 28 can in part even be omitted, as can be seen in FIG. 4. This reduction of these webs reduces the magnetic leakage flux.

Thus in the axial progression of the laminated core 30 in respect of a requirement the negative effects on other requirements are significantly reduced by the selective optimization of individual cut-outs 21 of a sector 29 by first configurations 81 and second configurations 82, in particular the pockets 10.

Figure 3:
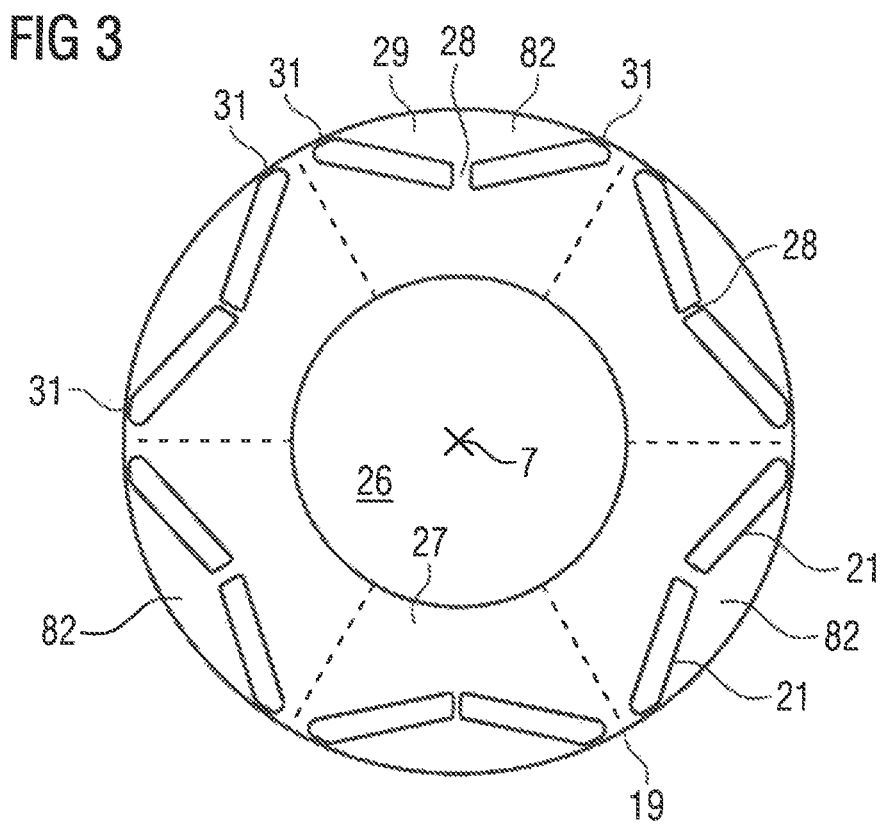

FIG. 3 shows a lamination 8 of a six-pole rotor 5, in which each sector 29 is designed the same. This lamination 8 thus has the basic layout in all sectors 29.

This lamination thus normally has no retaining lugs 24, no partial blankings 25, no reinforced edge webs 31, but merely has, where necessary, radial retaining webs 28 between the cut-outs 21 of a sector 29.

However, in accordance with the invention at least one sector 29 would be further developed, such that it has a first, second, etc. configuration.

FIG. 4 shows a lamination 8 of a six-pole rotor 5, in which a sector 29 has a second configuration 82. The other sectors have an identical first configuration 81, with no retaining elements being present there, and in particular no radial retaining webs 28 between the cut-outs 21 of a sector 29. The first configurations 81 can in this case have, at least individually, partial blankings 25, as are also shown by way of example in FIG. 7.

Likewise it is possible to design at least one further sector 29 with a second configuration 82, e.g. opposite.

Figure 5:
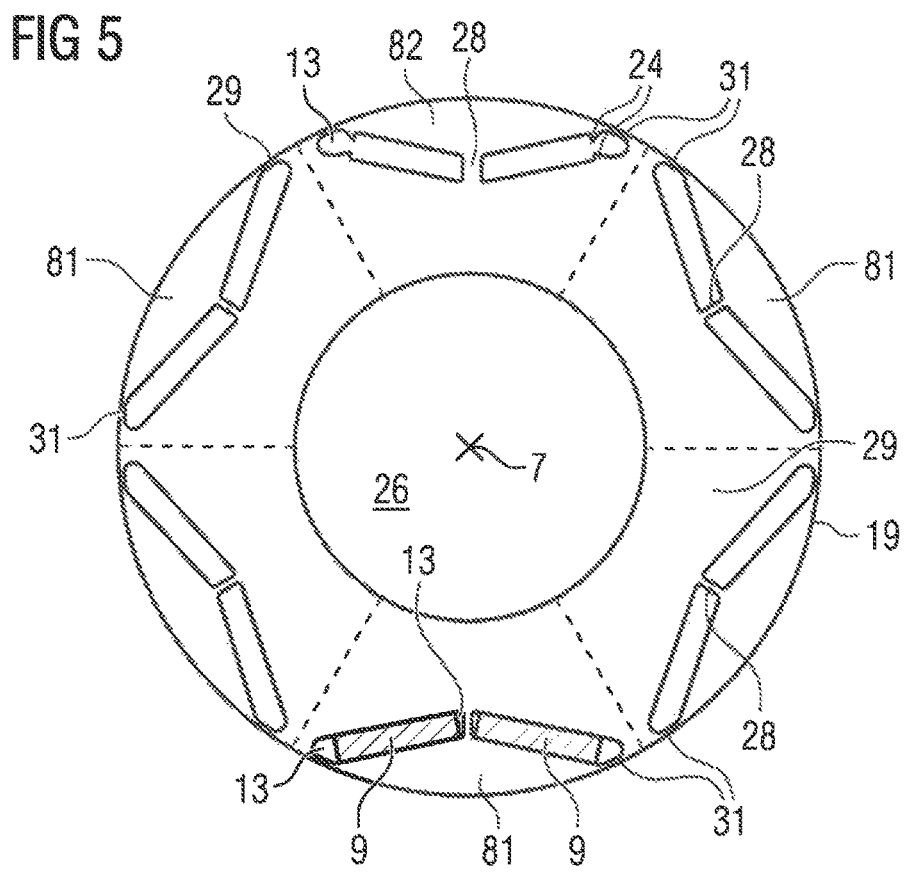

FIG. 5 shows a lamination 8 of a six-pole rotor 5, which in comparison with FIG. 4 also provides radial retaining webs 28 in the case of the cut-outs of the sectors 29 with a first configuration 81. The sector 29 with the second configuration 82 has reinforced retaining webs 28, which for example are designed to be trapezoidal in shape.

Likewise it is possible to design at least one further sector 29 with a second configuration 82, e.g. opposite.

Figure 6:
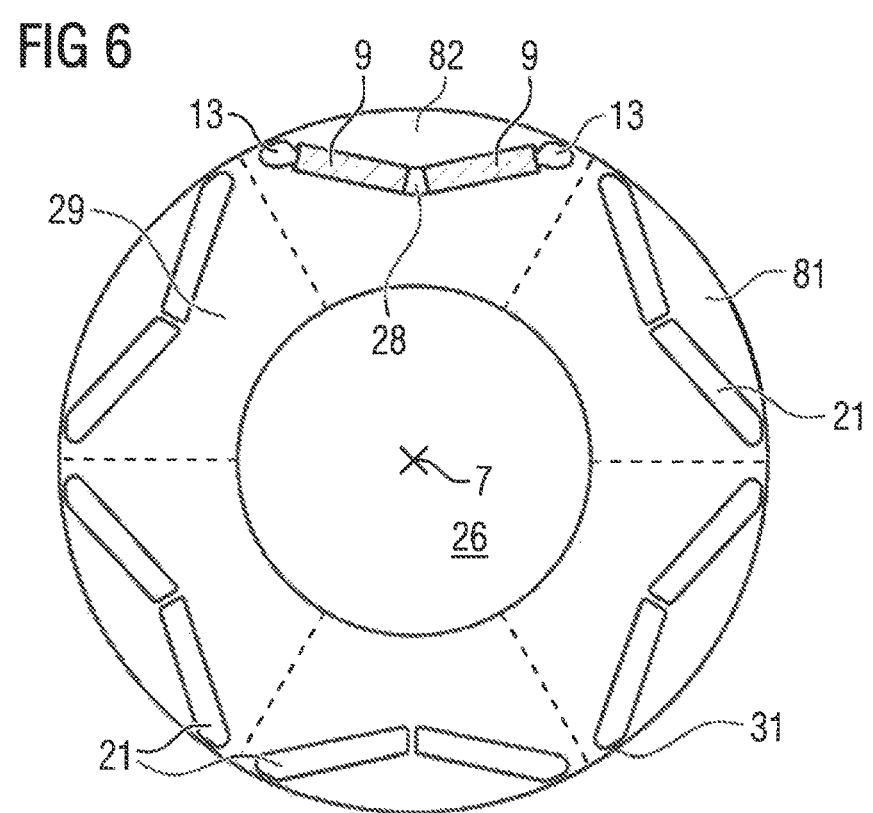

FIG. 6 shows a lamination 8 of a six-pole rotor 5, which in comparison with FIG. 4 also provides radial retaining webs 28 in the case of the cut-outs of the sectors 29 with a first configuration 81. The sector 29 with the second configuration 82 has reinforced retaining webs 28, which are designed to be trapezoidal in shape. This is particularly important at high speeds.

Likewise it is possible to design at least one further sector 29 with a second configuration 82, e.g. opposite.

FIG. 7 shows a detailed illustration of a sector 29 of a four-pole rotor 5, with a first configuration 81. The cut-out 21 is V-shaped. In this embodiment, the pockets 10 in which the permanent magnets 9 are located have partial blankings 25 of the pockets 10. An annular duct 18 of a distribution disk 16 via which a potting compound 20 is introduced into the cut-outs is shown as a dashed line.

A second optional annular duct can also introduce the potting compound via the radially outer flux barriers 13.

Figure 8:
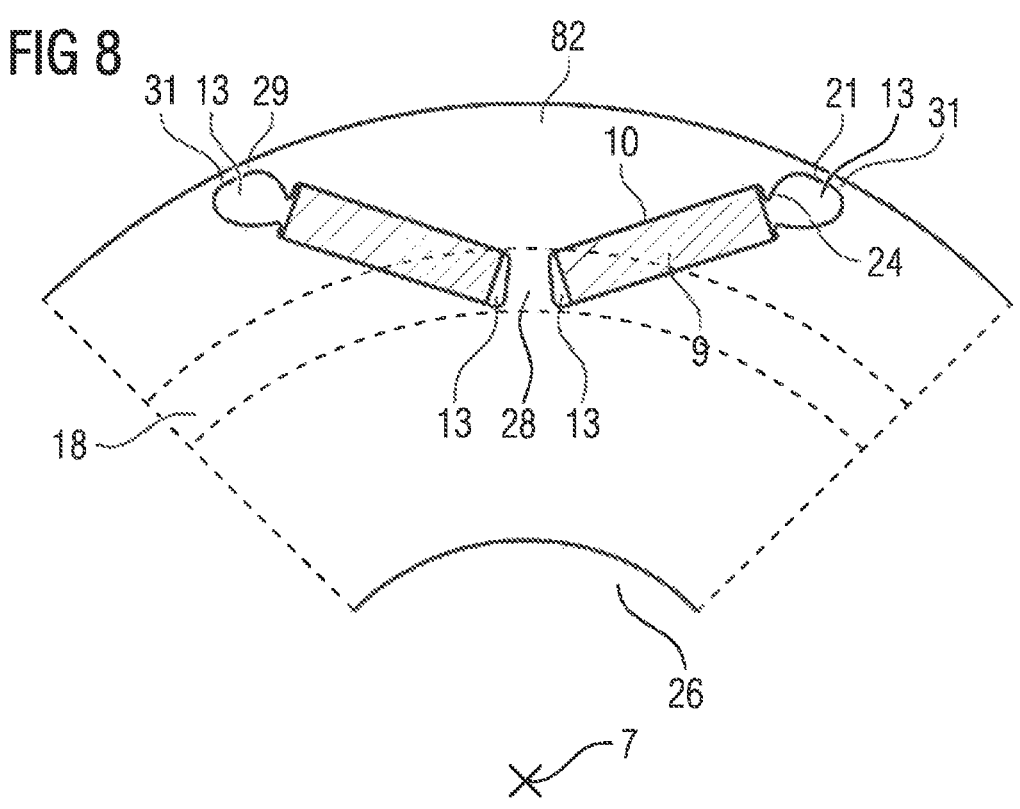

FIG. 8 shows a detailed illustration of a sector 29 of a four-pole rotor 5, with a second configuration 82. The permanent magnets 9 are arranged in a V-shape and are separated by a retaining web 28. The retaining web 28 and the edge webs 31 are in this case designed to be reinforced, i.e. wider, or radially thicker. Retaining lugs 24 fix the permanent magnets 9 in the cut-outs 21.

Figure 9:
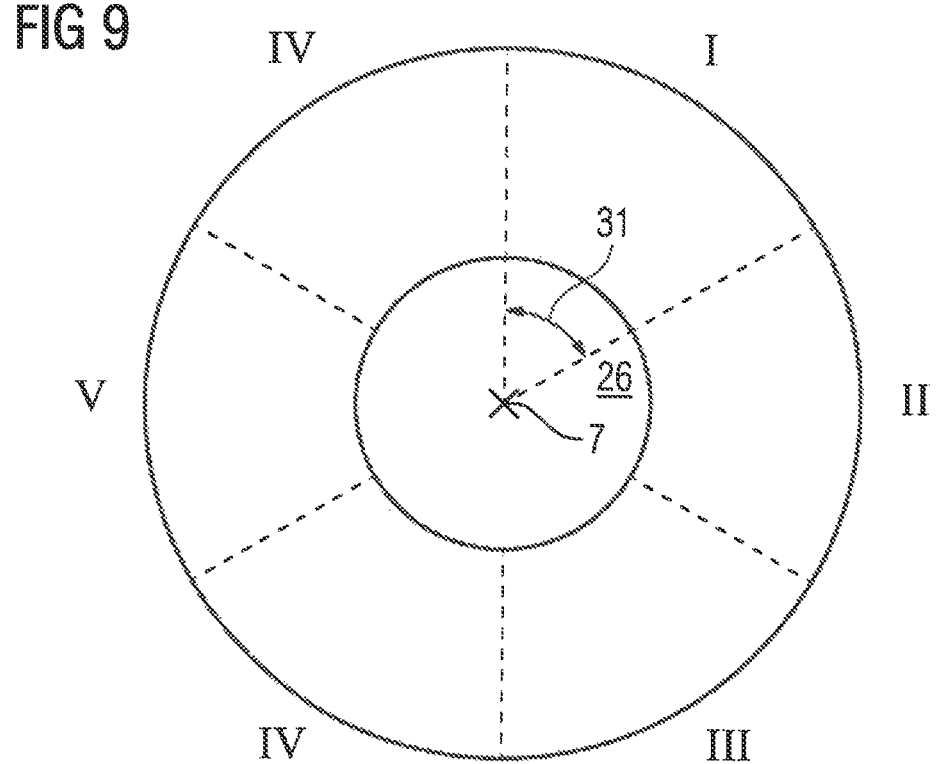
FIGS. 9, 10 show side views of a laminated core.

FIG. 9 shows the arrangement of the sectors 14 of a laminated core 30 of a six-pole rotor 5, and their assigned positioning I to VI, viewed in the circumferential direction.

When stacking or packaging the laminated core 30, for example, laminations 8 in accordance with FIG. 2 can now be arranged according to the invention as follows.

A predeterminable number of laminations 8 is arranged axially such that sectors 14 with a second configuration 82 are at position I. This means that sectors 29 with a first configuration 81 are accordingly at position II. Since the lamination 8 in accordance with FIG. 2 has the same configurations 81, 82 with opposing sectors 29, this means that the second configuration 82 is also at position IV. Likewise this means that the first configuration 81 is also at position V. The layout of the lamination or sector 29 at position III and VI can be a basic layout or a layout in accordance with a third pole sector 83.

In accordance with the invention, after this first stack, a second stack or a number of individual laminations 8 in accordance with FIG. 2 is rotated by at least an angle 31, in other words a pole pitch. This means that the sectors 29 with the second configuration 82 are now located at position II and V of the laminated core 30. The sectors with the first configuration 81 are now at position III and VI, since the configurations of the opposing sectors 29, viewed clockwise, have been further rotated about a position.

This type of stacking or packaging is continued over the entire length of the laminated core 30. In other words, viewed over the axial length of the laminated core 30, more and more positions I to IV are produced that have different configurations of their sectors 29. Thus, viewed axially, mechanical reinforcements (second configuration 82) of the individual sectors 29 and thus of the laminated core 30 are formed in part inter alia.

The laminations 8 can in this case optionally also be glued axially to one another. As individual laminations to one another or else as partial laminated cores.

After stacking the permanent magnets 9 are inserted axially into the cut-outs 21.

After this a distribution disk 16 is attached to form a seal on one or both sides of the laminated core 30. The laminated core 30 is potted via the distribution disk 16—as described later.

Instead of a rotation by an angle 31, a rotation and overlap of the laminations 8 can also take place.

This type of stacking of the laminations 8 can also be transferred to the lamination sections in accordance with FIGS. 3, 4, 5, 6 which are illustrated by way of example— but are not shown exhaustively.

Figure 10:
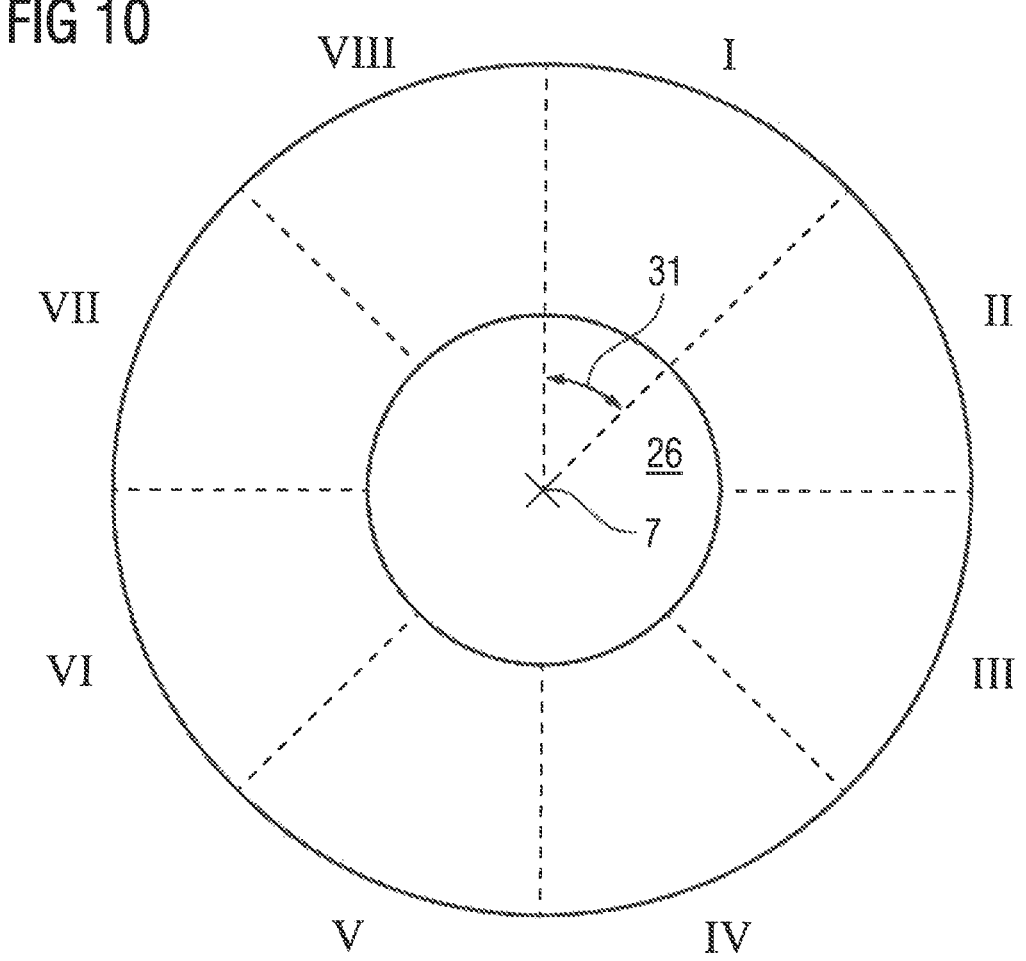

FIG. 10 shows the arrangement of the sectors 29 of an eight-pole rotor 5, and the positioning I to VIII, viewed in the circumferential direction. The embodiment in FIG. 9 should also be transferred analogously to FIG. 10.

This applies likewise for four-pole, ten-pole and twelve-pole rotors 5.

Figure 11:
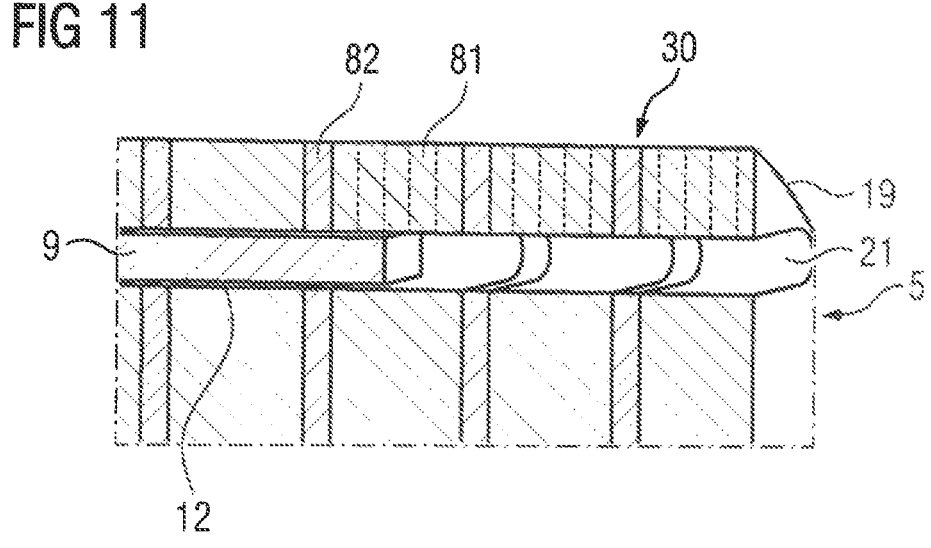
FIG. 11 shows a perspective partial view of a cut-out of a sector of the rotor.

FIG. 11 shows a perspective illustration of a cut-out 21 with the laminated core 30 surrounding it. Gaps 12 are located between the laminations 8 of the laminated core 30 and the permanent magnets 9, and enable the axial insertion of the permanent magnets 9, but are disadvantageous as regards electromagnetic and/or mechanical considerations. To facilitate the filling procedure of, inter alia, these gaps 12 by the potting compound 20, the partial blankings 25 described in FIG. 7 are helpful.

Figure 12:
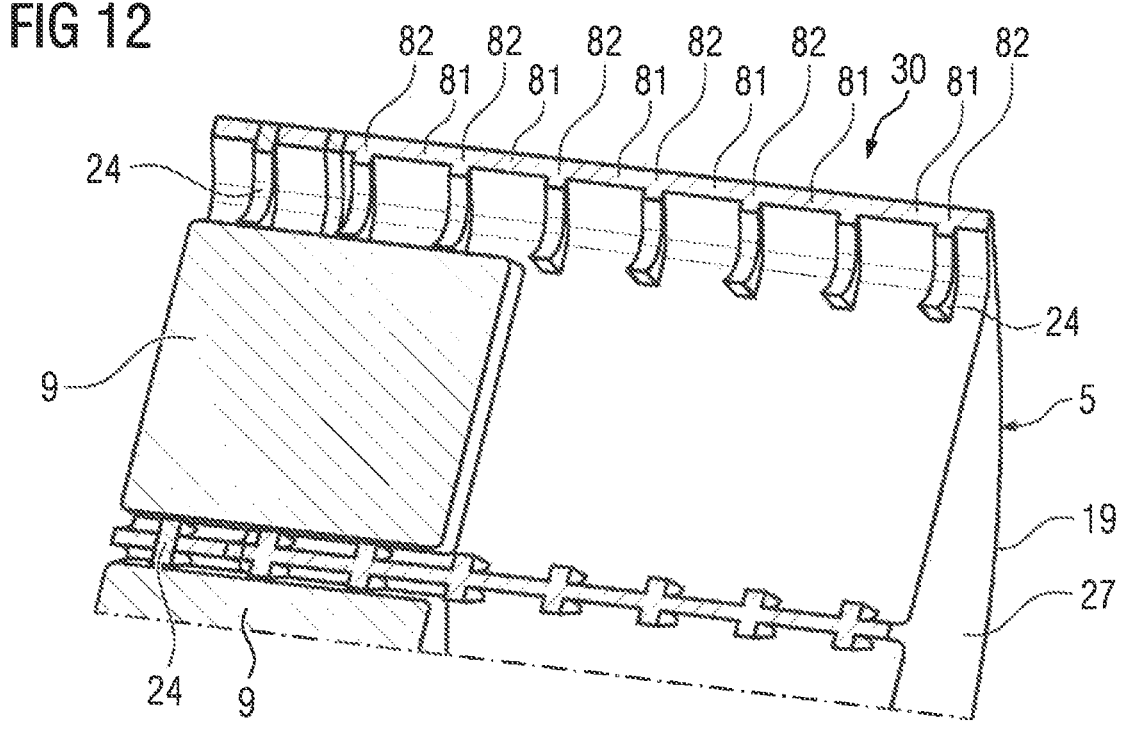
FIG. 12 shows a perspective partial view of a cut-out of a sector of the rotor.

FIG. 12 shows a perspective illustration of a section through such a laminated core 30, wherein a permanent magnet 9 is illustrated in a cut-out 21. Second configurations 82 of this sector 29 in this case fix the permanent magnets 9 using retaining lugs 24. This has the advantage that in the axially following laminations such a positioning is not necessary, since the permanent magnets 9 extend over a certain predeterminable axial length inside the laminated core 30.

Figure 13:
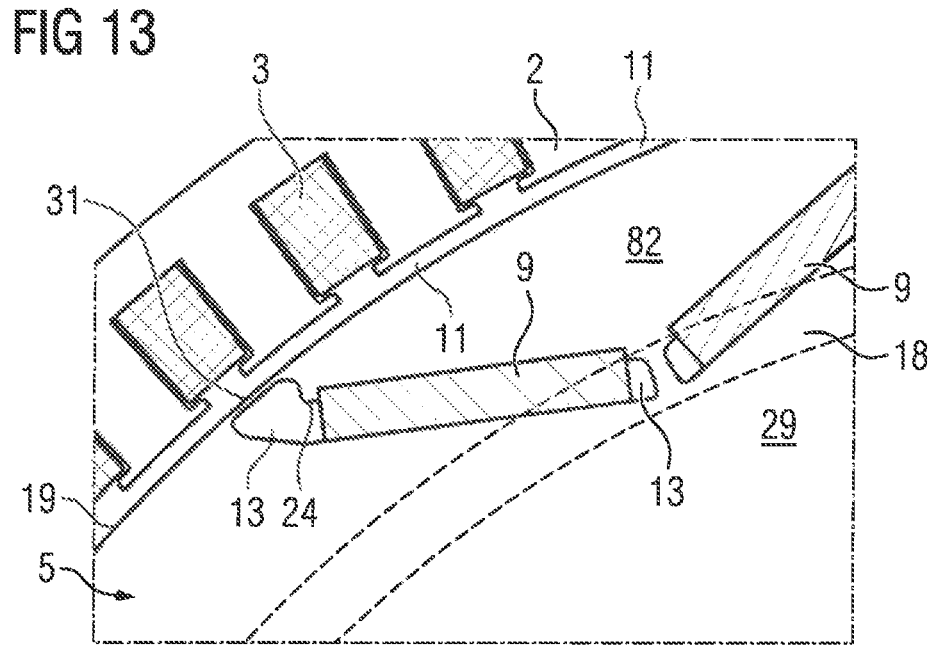
FIG. 13 shows a partial view of a cross-section of a dynamo-electric machine.

FIG. 13 shows a section of a dynamo-electric machine 1, with a winding system 3, which when energized generates a magnetic field which due to electromagnetic interaction with the rotor 5 displaced with the permanent magnet 9 generates a torque. In the pole 27, which is formed by two permanent magnets 9 arranged in a V-shape in their cut-outs 21, the permanent magnets 9 are fixed by the potting compound 20 or adhesive. The potting compound 20 was introduced into the cut-outs 21 inter alia via the flux barriers 13. In this illustration the pole 27 or the sector 29 thereof is formed with a second configuration 82. Annular ducts 18 of a distribution disk 16 located on the end face of the laminated core 30 are only illustrated by a dashed line.

Figure 14:
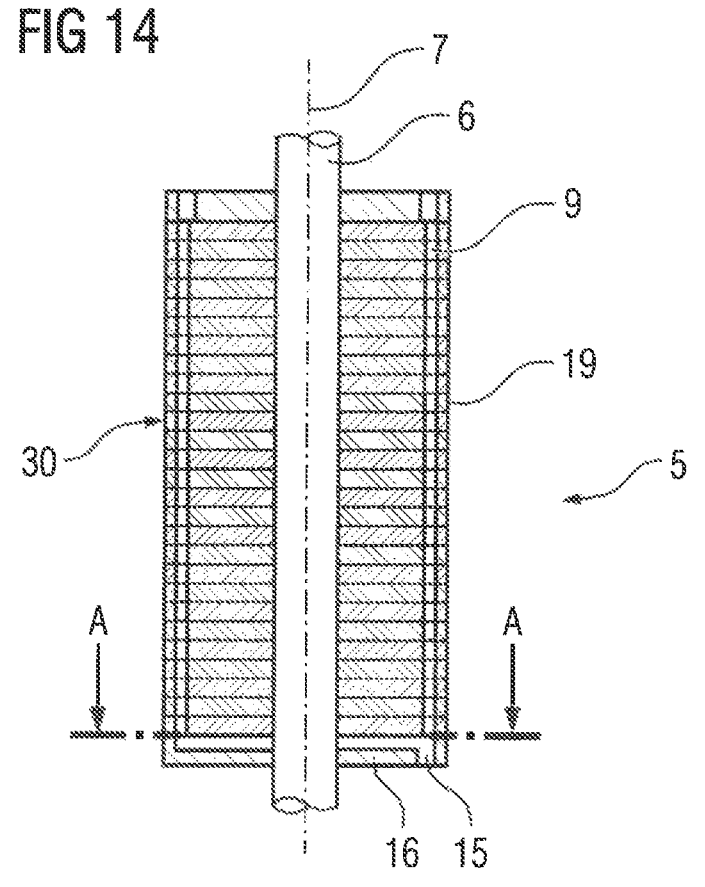
FIG. 14 shows a longitudinal section through an inventive rotor.

FIG. 14 shows a rotor 5, the laminated core 30 of which is stacked by two end disks, wherein at least one end disk is designed as a distribution disk 16. This distribution disk 16 has, on the side facing an end face of the laminated core 30, at least one annular duct 18 that can be filled via a feeder 15. A potting material, in particular a thixotropic material or an adhesive, is now applied under pressure via this feeder 15 to the annular disk 18 and if appropriate further extensions 17.

The laminations 8 are for example stacked beforehand on an auxiliary shaft. Likewise it is possible to glue the laminations 8. Punch stacking of the laminations 8 is likewise possible, in order to obtain a laminated core 30 of the rotor 5, into which the permanent magnets 9 can be inserted.

The distribution disk 16 is now positioned onto the laminated core 30 provided with permanent magnets 9, in order to perform the filling process. The distribution disk 16 can also have multiple feeders 15, in order to increase the amount of potting compound that can be fed.

The laminated core 30 and/or the distribution disks 16 are preferably shrunk onto the shaft 6. Other possibilities likewise exist for transferring the torque from the laminated core 30 to the shaft 6, such as feather key connections, etc. Axial stacking of the laminated core 30 can also take place using tie rod connections. To this end, axially running bore holes must then be provided in the laminated core 30 to accommodate a tie rod.

Additional stacking takes place when the laminated core 30 is located on the actual shaft 6. In this case the laminated core 30 is pressed together by means of two disks, in particular at least one distribution disk 16.

Figure 15:
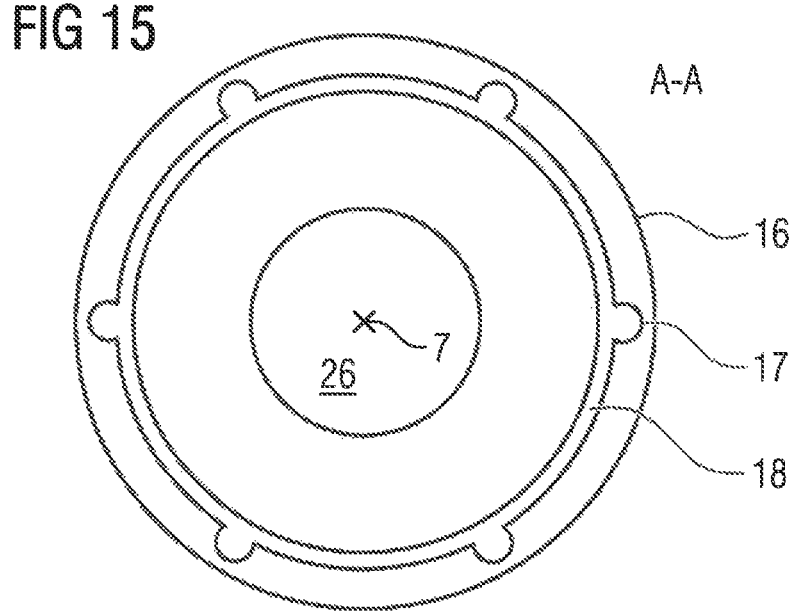
FIG. 15 shows a distribution disk.

FIG. 15 shows a section through the distribution disk 16, taken along a section line A-A in FIG. 14, in which a circumferential annular duct 18, open on one side, is provided and which as an optional design has expansions 17 which each supply a pole 27 or sector 29 of the rotor 5 with a potting compound 20.

The distribution disk 16 has, on the side facing the laminated core 30 of the rotor 5, at least one circumferential annular duct 18, open on one side, which runs in particular at the level of the radially further inward flux barriers 13. The annular duct 18 forms a form-fit and tight seal with the end face of the laminated core 30. The annular duct 18 has optional extensions 17 in the region of the flux barriers 13, which form axially running ducts. Thus inter alia the same type of distribution disks 16 can be used with different laminations of the rotor 5.

At least one injection opening, in other words a feeder 15, is provided on the side of the distribution disk 16 facing away from the laminated core 30, in order to feed the annular duct 18. The flux barriers 13 are fed with a potting compound 20 via the annular duct. The distribution disk 16 optionally has a further annular duct 18 concentric thereto, in order also to be able to provide sufficient potting compound for the respective pole 27 via the radially outer flow barriers 13 of the cut-out 21 of a pole 27 of the rotor 5.

The annular duct 18 and optionally the extension 17 thereof form a form-fit and tight seal with the end face of the laminated core 30, in order to be able to build up a corresponding pressure of the potting compound or of the adhesive and thus the necessary shear forces.

The potting compound 15 mixed in advance, in particular in situ, is now pressed into the laminated core 30 of the rotor 5 at a predeterminable pressure via the feeder 15.

With this potting compound 20, which is in particular designed as a thixotropic material, a comparatively low viscosity occurs due to the increased shear forces, which allows the potting compound 20 to penetrate into the gaps and cut-outs 21 of the laminated core 30 that are occupied by permanent magnets 9. In the potting process the potting compound is now pressed in under a predeterminable pressure and because of the lower viscosity it is distributed in the flux barriers 13 or gaps 12 between permanent magnets 9 in the laminated core 30. Monitoring the pressure can end the process, so that at the moment when the shear forces are reduced (pressure reduction) the potting compound experiences an increase in viscosity and thus the process of potting is or can be terminated. As soon as the potting compound has been distributed in the gaps and flux barriers 13 around the permanent magnet 9 and a further expansion into the intermediate spaces of the laminations 8 (in other words a plane perpendicular to the axis) is present, the necessary pressure increases, and can then be used as a criterion for terminating the potting. This prevents the potting compound for example from penetrating radially between the laminations of the rotor 5 and in particular reaching the surface 19 of the rotor 5.

In this case the potting compound 20 is pressed in axially via the adjoining flux barriers 13, wherein in this case the potting compound 20 then seeks out the further path between the permanent magnets 9 and the laminations, in order also to penetrate into the radially externally located flux barriers 13 and likewise to fill them. By monitoring the pressure when filling the potting compound 20 and thus the shear forces the procedure can be terminated as soon as the "cut-outs are full". In this case this prevents the potting compound 20 from reaching the surface 19 of the rotor 5, particularly via the comparatively narrow edge webs 31, especially in the sectors 29 with a first configuration 81.

The potting compound 20 or the adhesive can also fill the necessary cavities of the laminated core 30 without external pressure.

FIGS. 16 to 26 show configurations of cut-outs 21 to accommodate permanent magnets 9 and to form poles 27. To simplify the drawing only some first and second configuration features mentioned above are illustrated.

These further FIGS. 16 to 26 show, in non-limiting or non-exhaustive embodiments, arrangements of permanent magnets 9 inside a sector 29 or pole 27 which can have a first configuration 81 or a second configuration 82.

In this case each permanent magnet 9 of course has flux barriers 13, not described in greater detail, and retaining elements 24, at least in part.

Figure 16:
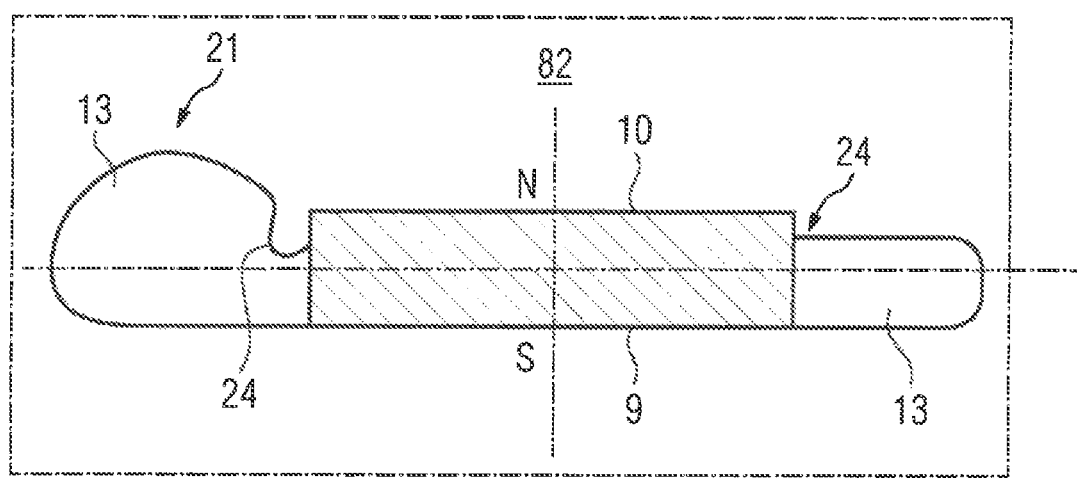
FIGS. 16 to 26 show configurations of poles of the rotor.

In this case FIG. 16 shows a cut-out 21 of a pole 27 with a sector 29 of a second configuration 82, which as an additional feature over and above the basic layout has the retaining element, as differently designed retaining lugs 24.

Figure 17:
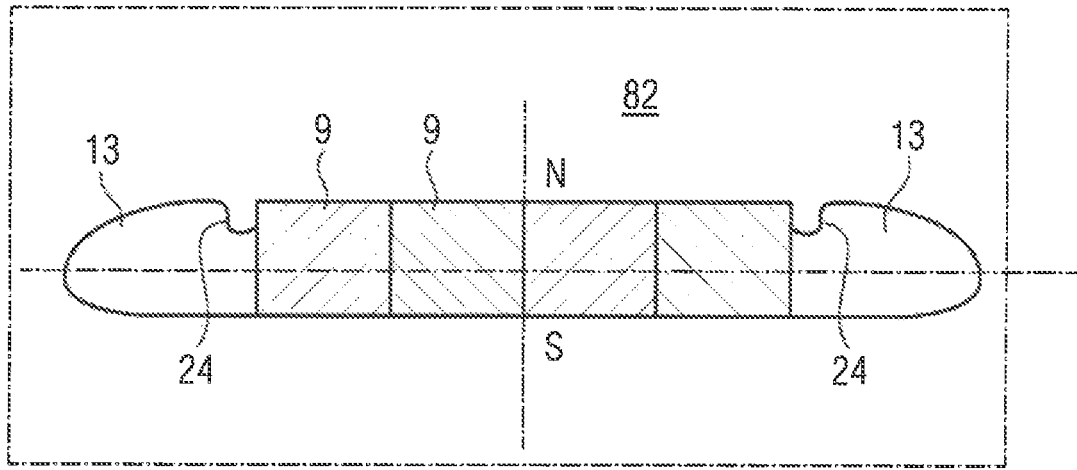

FIG. 17 shows a sector 29 with a second configuration 82, which has two retaining lugs 24.

By way of example, it is shown what can in principle be the case with each cut-out 21, namely that the permanent magnets 9 in a pocket 10 in the circumferential direction and/or axial direction can be composed of multiple permanent magnets 9.

Figure 18:
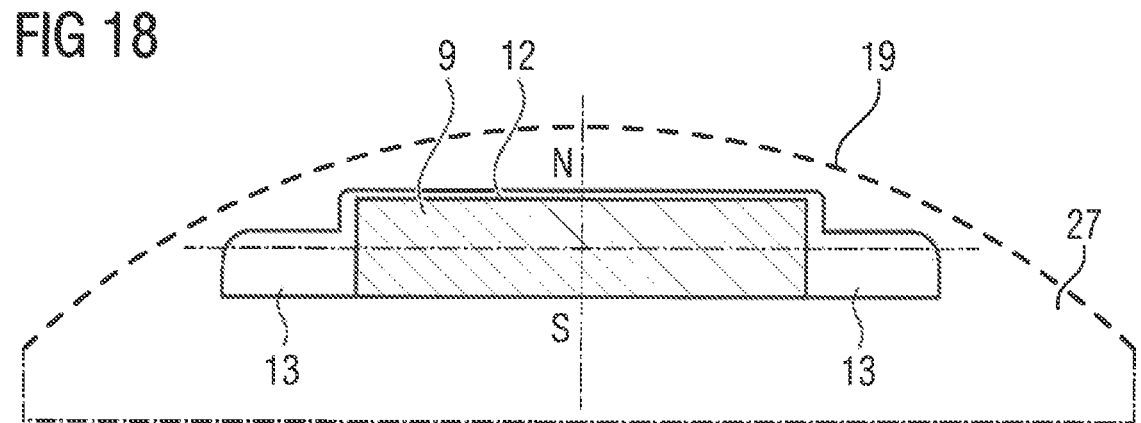

FIG. 18 shows one possible embodiment of a sector 29 with a second configuration 82.

Figure 19:
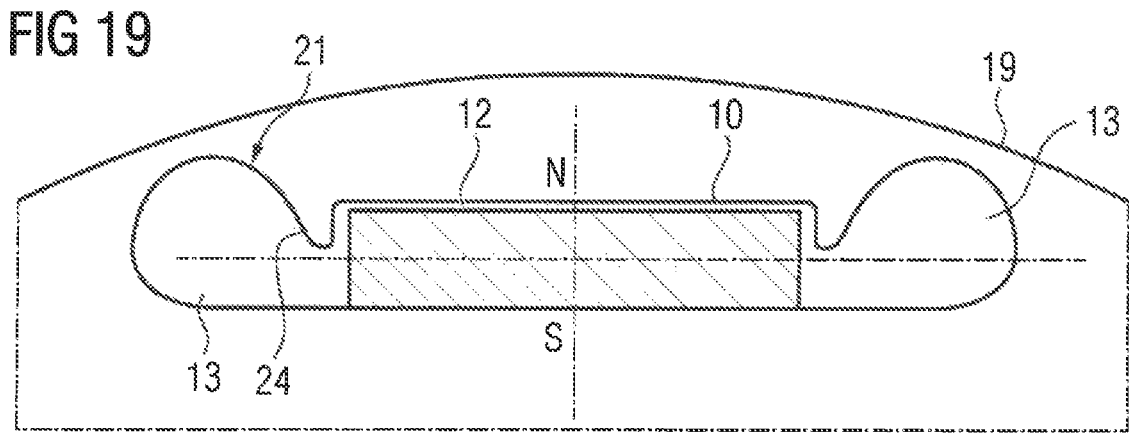

FIG. 19 shows a further possible embodiment of a sector 29 with a second configuration 82.

Figure 20:
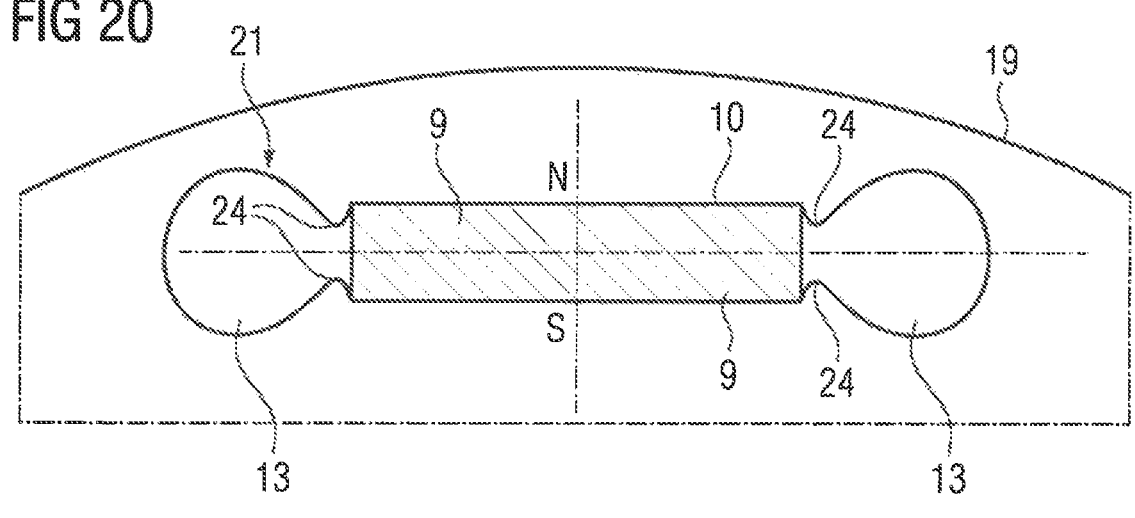
Figure 21:
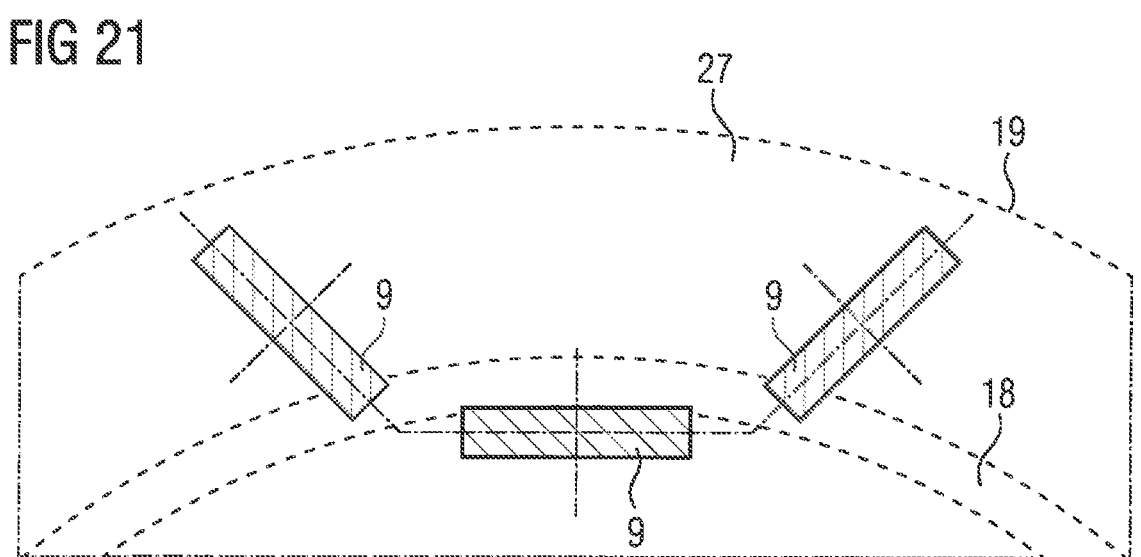
Figure 22:
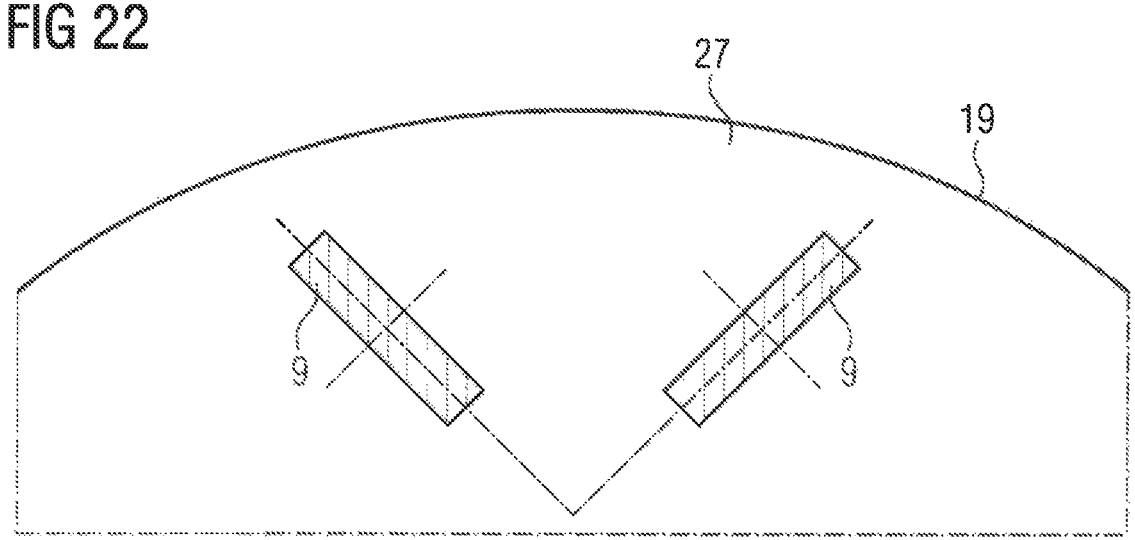
Figure 23:
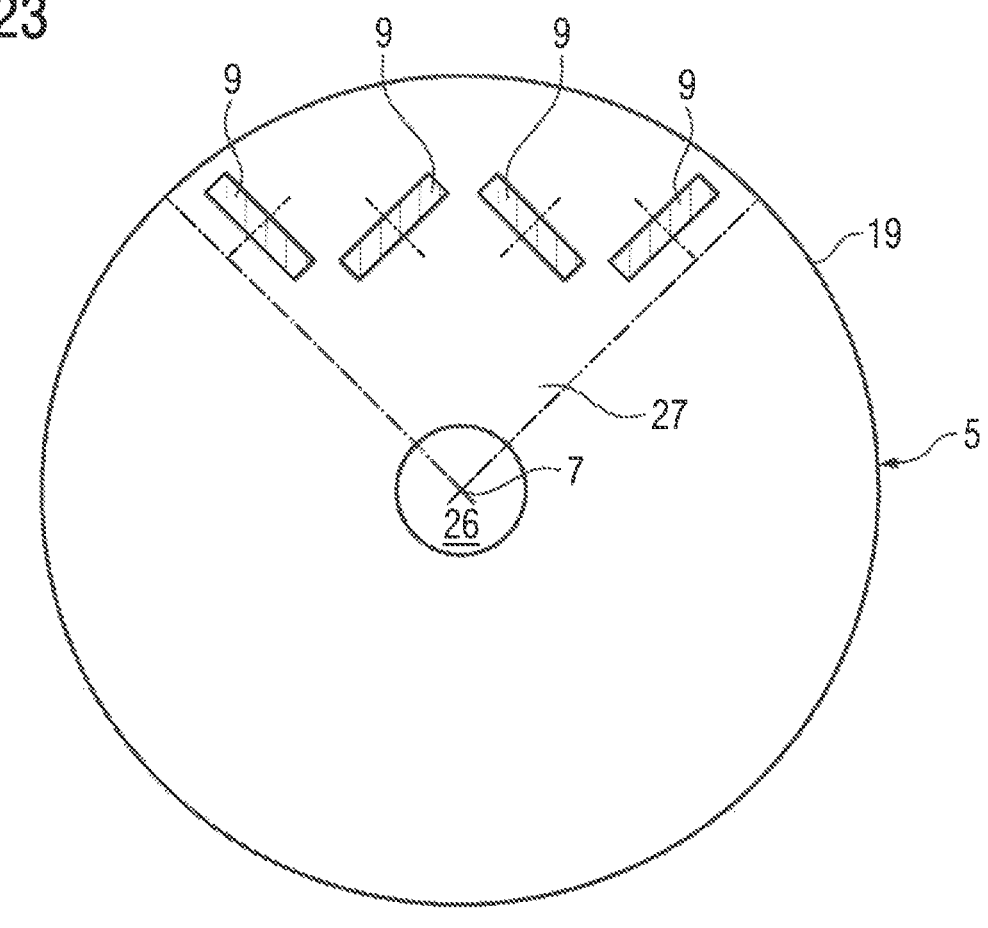
Figure 24:
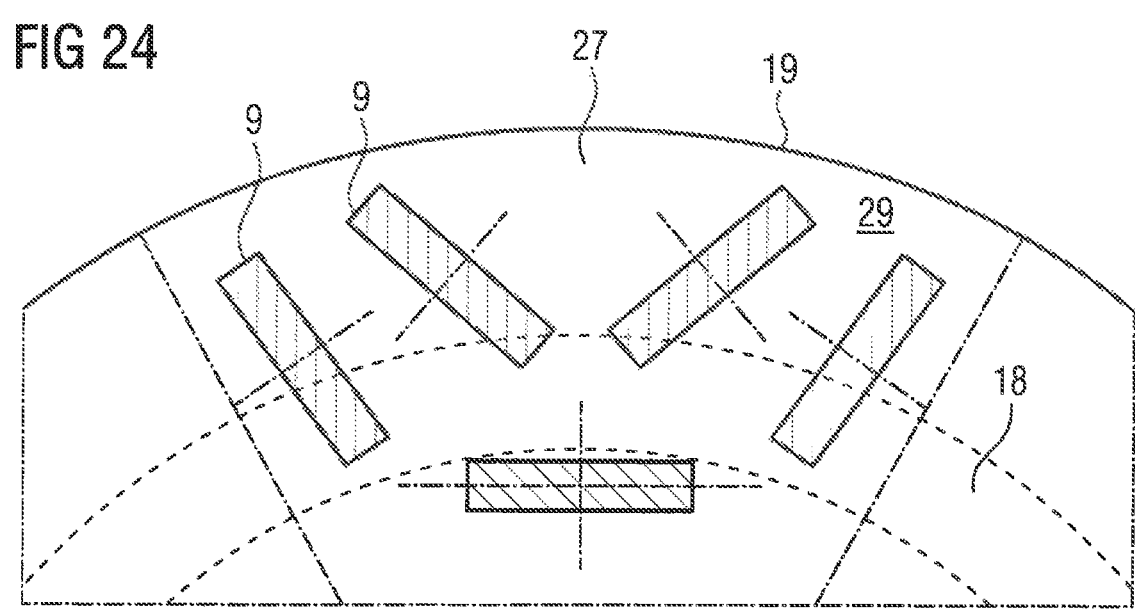
Figure 25:
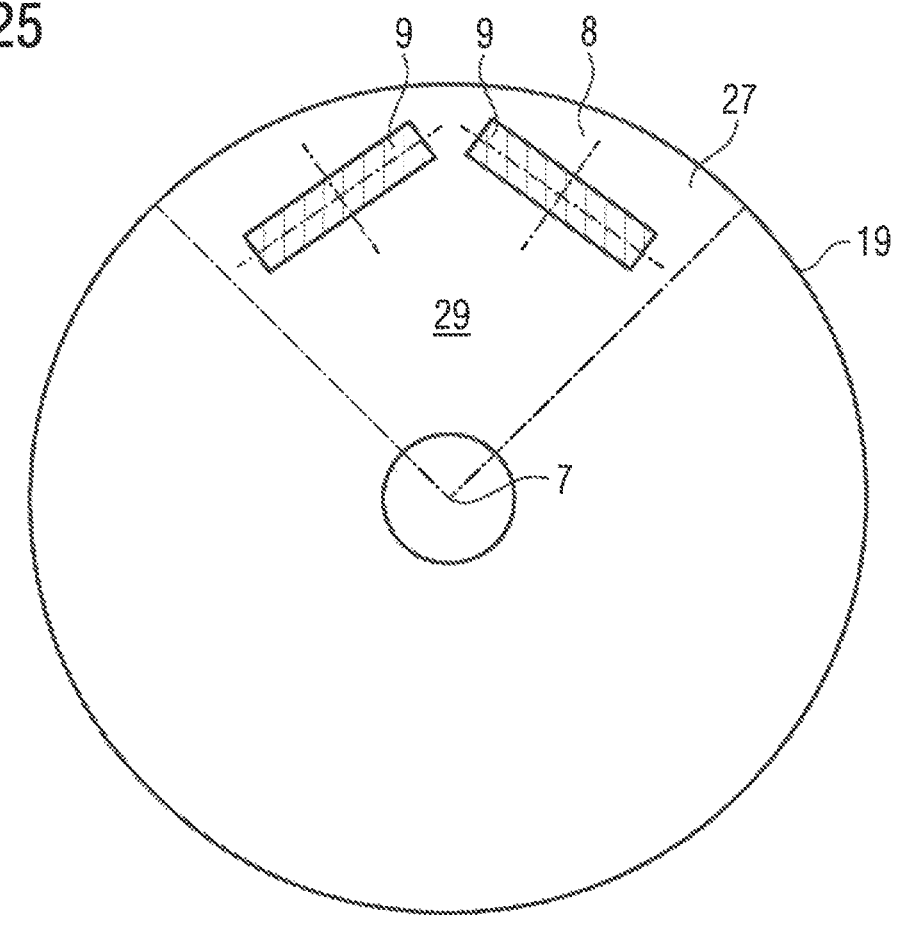
Figure 26:
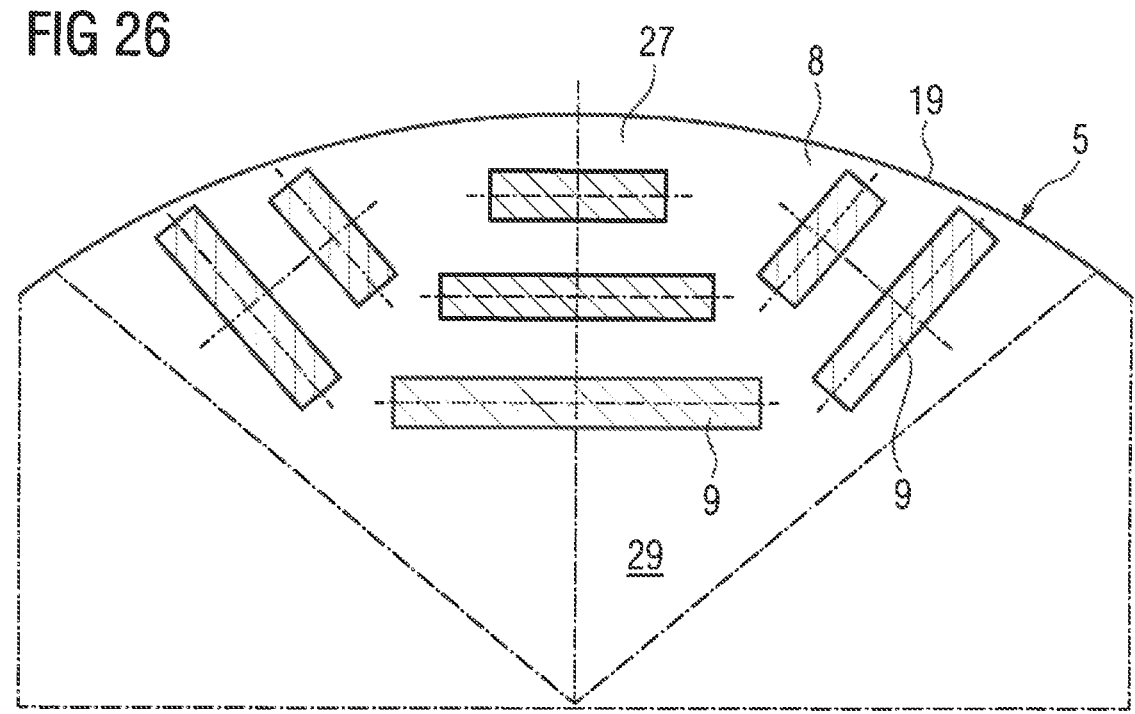

FIG. 20 shows a further possible embodiment of a sector 29 with a second configuration 82, in which opposing retaining lugs 24 of a cut-out 21 are present.

FIGS. 21 to 26 show possible configurations of poles 27 and their arrangements of cut-outs 21 with their permanent magnets 9 for which the explanations set out above apply. For reasons of clarity, the cut-outs 21 have only been shown with their permanent magnets 9. Retaining elements and flux barriers 13, in other words also partial blankings 25, have been suppressed.

A permanently excited synchronous machine with an inventive rotor 5, the permanent magnets 9 of which are arranged buried and are potted, in particular fixed with such a thixotropic potting compound, achieves a comparatively high efficiency and is accordingly particularly suitable for many work machines, especially those in continuous operation.

The production of such a rotor 5 becomes particularly easy with the thixotropic potting compound thanks to the inventive method.

The invention can also be applied analogously to laminations of a first and second configuration. In this case a lamination satisfies the mechanical requirement or the electromagnetic requirement.

What is claimed is:

1. A rotor of a dynamo-electric permanently excited machine, the rotor comprising:

a laminated core including laminations and having substantially axially running, circumferentially closed cutouts which have regions of pockets and flux barriers, with retaining elements projecting at least partially into the cut-outs;

permanent magnets arranged in the pockets of the cut-outs of the laminated core to form a predeterminable number of poles which form sectors of at least two different configurations in a predeterminable axial order and rotation or axial order and rotation and overlap, with the permanent magnets and flux barriers guiding a magnetic flux, wherein the laminations, independently of a configuration of the sectors, each have a shaft bore, an identical number of poles or sectors, axial cut-outs and an identical outer diameter, wherein the sectors with a first one of the at least two different configurations include elements for distribution of a potting compound or of an adhesive inside the laminated core, and the sectors with a second one of the at least two different configurations include the retaining elements for mechanical strength of the laminated core, wherein the flux barriers and substantially axial gaps between the permanent magnets and the laminated core surrounding the permanent magnets are filled with the adhesive and/or the potting compound, the rotor further comprising:

a distribution disk for the adhesive and/or the potting material on at least an end face of the laminated core, said distribution disk including an annular duct at a level of the flux barriers.

2. The rotor of claim 1, wherein the retaining elements of the sectors with the second one of the at least two different configurations include retaining webs and/or retaining lugs and/or edge webs in a region of the cut-outs.

3. The rotor of claim 1, wherein the first one of the at least two different configurations or a third configuration of the sectors has partial blankings in the pockets.

4. The rotor of claim 3, wherein the partial blankings meander when viewed in an axial progression of the pockets.

5. The rotor of claim 1, wherein the distribution disk includes a second annular duct at a level of radially further inwardly lying ones of the flux barrier or further outwardly lying ones of the flux barriers.

6. A dynamo-electric machine, in particular a permanently excited synchronous machine, the dynamo-electric machine comprising a rotor as set forth in claim 1.

7. The dynamo-electric machine of claim 6 for use in a compressor, compactor, pump, and as drive of a conveyor belt, in the food industry and in a maritime application.

8. A method for producing a rotor of a dynamo-electric permanently excited machine, the method comprising:

forming a laminated core by stacking axially layered laminations with at least two different pole sectors of axial order and rotation or of axial order and rotation and overlap, with the laminations, independently of a configuration of their sectors, each have a shaft bore, an identical number of poles or sectors, axially aligned cut-outs and an identical outer diameter, wherein sectors with a first configuration include elements for distribution of a potting compound or of an adhesive/optimization of a magnetic flux inside the laminated core and sectors with a second configuration including retaining elements for mechanical strength of the laminated core;

inserting permanent magnets into the cut-outs;

attaching a distribution disk to at least one end face of the laminated core, with the distribution disk including at least one feed opening and at least one annular duct on a side facing the laminated core, which duct covers at least part of the flux barriers of each of the cut-outs, and potting with an adhesive and/or a potting compound cavities of the laminated core via the at least one feed opening and the at least one the annular duct of the distribution disk, the flux barriers, and substantially axially running gaps between the permanent magnets and the laminated core surrounding the permanent magnets, so that at least the permanent magnets of the rotor are fixed.

9. The method of claim 8, further comprising rotating the laminations with a sector of the first configuration at a first position after a predeterminable number of the laminations, in particular about a pole or sector, so that each one of the poles has magnetic or mechanical optimizations at predeterminable axial distances, in that a position of the sectors of first configuration is occupied from the first position up to the number of poles of the rotor.

10. The method of claim 8, further comprising feeding the potting compound or adhesive, in particular a thixotropic potting compound into the rotor, in particular into the cut-outs, via the at least one feed opening of the distribution disk under a predeterminable pressure (without pressure and with pressure).

11. A dynamo-electric machine, in particular a permanently excited synchronous machine, the dynamo-electric machine comprising a rotor produced by a method as set forth in claim 8.

12. The dynamo-electric machine of claim 11 for use in a compressor, compactor, pump, and as drive of a conveyor belt, in the food industry and in a maritime application.

* * * * *